United States Patent [19]
Fujii

[11] Patent Number: 6,023,775
[45] Date of Patent: Feb. 8, 2000

[54] FAULT INFORMATION MANAGEMENT SYSTEM AND FAULT INFORMATION MANAGEMENT METHOD

[75] Inventor: Yasuo Fujii, Kawasaki, Japan

[73] Assignee: Fujitsu Limited, Kanagawa, Japan

[21] Appl. No.: 08/829,188

[22] Filed: Mar. 31, 1997

[30] Foreign Application Priority Data

Sep. 18, 1996 [JP] Japan .................................. 8-246379

[51] Int. Cl.[7] .................................................. G06F 11/00
[52] U.S. Cl. ............................................. 714/48; 714/712
[58] Field of Search .............................. 707/2; 371/20.1; 395/185.01; 714/48, 712

[56] References Cited

U.S. PATENT DOCUMENTS

| | | | |
|---|---|---|---|
| 5,428,619 | 6/1995 | Schwartz et al. | 714/712 |
| 5,533,193 | 7/1996 | Roscoe | 714/39 |
| 5,594,861 | 1/1997 | Jonsson et al. | 714/2 |
| 5,708,775 | 1/1998 | Nakamura | 714/48 |
| 5,765,158 | 6/1998 | Burrows | 707/101 |

*Primary Examiner*—Paul R. Myers
*Attorney, Agent, or Firm*—Helfgott & Karas, P.C.

[57] ABSTRACT

A fault information management apparatus, which is used with a transmission apparatus for sending information in a network, manages information related to faults that occurred in the transmission apparatus and provides the fault information to a monitoring apparatus for the transmission apparatus. The fault information management apparatus comprises a fault history preparation section which, upon receipt of the fault information, prepares a fault history for the monitoring apparatus, and a report processing section which, on the basis of the fault history prepared by the fault history preparation section and independently of fault history preparation processing carried out by the fault history preparation section, carries out processing for reporting the fault information to the monitoring apparatus. This structure allows processing for preparing a history of faults and processing for reporting information regarding the faults to be carried out independently of each other, so that the fault history preparation processing can be speeded up so as to efficiently carry out the processing for failure occurrence and the processing for failure correction at a high speed.

18 Claims, 28 Drawing Sheets

27: AIDTYPE TABLE

28: AID TABLE (STM1RS/STM1MS)

29: AID TABLE (AU4/VC4)

30: AID TABLE (TU12/VC12)

$1 \leq a \leq 7$
$b = 1$
$1 \leq c \leq 3$
$1 \leq d \leq 7$
$1 \leq e \leq 3$

31: AID TABLE (C12)

$4 \leq a \leq 6$
$1 \leq b \leq 21$

FIG. 9

| | |
|---|---|
| LOS | Loss of signal |
| LOF | Loss of frame |
| E-ERR | E-error |
| AIS | Alarm indication signal detected |
| LOP | Loss of pointer |
| ⋮ | |
| E-SD | E-signal degrade |

FIXED LENGTH n

32: FAULT NAME TABLE

FIG. 26
RELATED ART

54G : HISTORY TABLE

| No. | LOCATION OF FAULT | FAULT | INFORMATION 1 | 2---n | OCCURRENCE TIME | RECOVERY TIME | REPORT OF OCCURRENCE | REPORT OF RECOVERY |
|---|---|---|---|---|---|---|---|---|
| 1 | | | | | | | | |
| 2 | | | | | | | | |
| 3 | | | | | | | | |
| N | | | | | | | | |

FIG. 27(a)
RELATED ART

54G : HISTORY TABLE

| No. | LOCATION OF FAULT | FAULT | INFORMATION 1 | 2 | n | OCCURRENCE TIME | RECOVERY TIME | REPORT OF OCCURRENCE | REPORT OF RECOVERY |
|---|---|---|---|---|---|---|---|---|---|
| 1 | --- | --- | --- | --- | --- | --- | --- | | |
| | | | | | | | | | |
| X | --- | K | --- | --- | --- | T1 | | UN REPORTED | UN REPORTED |
| | | | | | | | | | |
| N | | | | | | | | | |

FIG. 27(b)
RELATED ART

54G : HISTORY TABLE

| No. | LOCATION OF FAULT | FAULT | INFORMATION 1 | 2 | n | OCCURRENCE TIME | RECOVERY TIME | REPORT OF OCCURRENCE | REPORT OF RECOVERY |
|---|---|---|---|---|---|---|---|---|---|
| 1 | --- | --- | --- | --- | --- | --- | --- | | |
| | | | | | | | | | |
| X | --- | K | --- | --- | --- | T1 | T2 | REPORTED | UN REPORTED |
| | | | | | | | | | |
| N | | | | | | | | | |

FAULT INFORMATION MANAGEMENT SYSTEM AND FAULT INFORMATION MANAGEMENT METHOD

BACKGROUND OF THE INVENTION (1) Field of the Invention

The present invention relates to a fault information management apparatus and a fault information management method which are suitable for a system for monitoring information about faults arising in transmission apparatuses within a network.

(2) Description of the Related Art

In recent years, the degree of complexity and the capacity of a transmission apparatus used in a network, represented by an SDH (Synchronous Digital Hierarchy) transmission network, have increased. In association with such trend in the transmission apparatus, the accuracy of management and monitoring of faults have also been improved. Therefore, it is now essential to completely and correctly process at high speed a large amount of fault information arising in the transmission apparatuses.

FIG. 21 is a block diagram representing one example of a transmission apparatus monitoring system. As shown in FIG. 21, a transmission apparatus monitoring system 60 is comprised of a monitoring apparatus (network monitoring system (NMS)) 50, and transmission apparatuses (network element (NE)) 51-1 to 51-n (n is a natural number). The monitoring apparatus 50 monitors, in a centralized manner, fault information arising in the transmission apparatuses 51-1 to 51-n through use of a work station (WS), or the like. It is designed so that one monitoring apparatus 50 can monitor a plurality of transmission apparatuses 51-i (where i=1 to n) collectively through a network. The following descriptions will be based on the assumption that an SDH transmission scheme is applied to the above-described monitoring system 60.

As shown in FIG. 22, each transmission apparatus 51-i is comprised of a main signal unit 52, a main signal unit control section 53, and an interface processing section 54 which acts as a fault information management unit. The main signal unit 52 performs various kinds of processing, such as processing for multiplexing electrical signals received from an unillustrated exchange so as to obtain a multiplexed signal and converting it into an optical signal to be transmitted to another transmission apparatus 51-i. The main signal unit 52 is designed so as to be able to detect information regarding transmission failures, faults in the transmission apparatus, and the like that occur during the above-described processing operations.

More specifically, the main signal unit 52 is made up of; e.g., STM1 optical units (STM1 slots) 52a, multiplexing units (TSI slots) 52c, D12 channel units (D12 slots) 52e and 52f, a D12 channel changeover unit (CHSW slot) 52g, and power units (PWR slots) 52h.

Each of the STM1 optical units 52a carries out electricity-to-light conversion. Specifically, the STM1 optical unit 52a converts an electrical signal received from the exchange into an optical signal so that it can be transmitted to another transmission apparatus 51-i and the monitoring apparatus 50. The multiplexing unit (time slot interchange (TSI)) 52c provides line connection between the STM1 optical unit 52a and the D12 channel unit 52e (52f). This multiplexing unit 52c demultiplexes a multiplexed signal (i.e., an STM1 frame) received from the STM1 optical unit 52a so as to obtain separated signals corresponding a plurality of channels. Each of the thus-separated signals is sent to the corresponding D12 channel unit 52e (or 52f). In contrast, the multiplexing unit 52c multiplexes signals received from the D12 channel units 52e (or 52f) and sends the thus-multiplexed signal to the STM1.

Each D12 channel unit 52e is an interface unit capable of handling C12 signals (2 Mb/s), which conform to a PDH (Presiochronous Digital Hierarchy), for 21 channels (ch). Three D12 channel units 52e are provided in this example so that the C12 signals for up to 63 channels can be multiplexed. The D12 channel unit 52f operates as a replacement when any of the D12 channel units 52e becomes impossible to operate for reasons of a breakdown, etc. Namely, the D12 channel unit 52f is provided as a protection unit (or a spare unit) for the D12 channel units 52e.

The D12 channel changeover unit 52g carries out an operation to switch the faulty D12 channel unit 52e to the protection unit 52f, as previously described. The power units 52h supply the electrical current and voltage required to operate the transmission apparatus 51-i.

In the main signal unit 52 shown in FIG. 23, a unit which is identical with the STM1 optical unit 52a can be mounted into a free area (or an unoccupied slot) 52b. For instance, if the STM1 optical unit 52a is mounted into each free area 52b, it will become possible to process signals in a number of up to twice as many as the above-described number of channels (2 Mb/s×63 ch). Each of the above-described STM1 optical units 52a, the TSI units 52c, and the D12 channel units 52e has the capability of detecting faults arising in itself.

Optical transmission between the transmission apparatuses 51-i is carried out over optical cables, etc. For example, if the transmission apparatus 51-i receives C12 signals (electrical signals for a maximum of 63 channels) complying with the PDH, the transmission apparatus 51-i multiplexes the C12 signals of the channels through the D12 channel units 52e and the TSI units 52c, as shown in FIG. 24, whereby a multiplexed frame is assembled. This multiplexed frame is converted into an optical signal by the STM1 optical unit 52a, and the optical signal is then sent to another transmission apparatus 51-i. An STM1 frame complying with the SDH is used in the optical transmission between the transmission apparatuses 51-i shown in FIG. 24, and therefore the multiplexed frame is sent as an optical signal having a bit rate of 150 Mb/s.

The main signal unit control section 53 shown in FIG. 22 (corresponding to the MPL unit shown in FIG. 23) controls an operating state of each main signal unit 52 through a bus (indicated by arrow A in FIG. 22) by use of an internal CPU (Central Processing Unit not shown). In this example, the main signal unit control section 53 is designed so as to collect fault information upon reception of a report indicating occurrence of a fault in the main signal unit 52.

The interface processing section 54 establishes connection with the monitoring apparatus 50 through the network. In this example, the interface processing section 54 prepares a fault history on the basis of the fault information which is sent from the main signal unit control section 53 every time a fault arises in the main signal unit 52. The interface processing section 54 sends the fault information in a format complying with the communication scheme of the monitoring apparatus 50 (i.e., connection standard such as R232C or X.25). The interface processing section 54 is comprised of a SAC unit (SAC) 54a and an SV interface control unit (NML) 54b, as shown in FIG. 23.

To this end, the interface processing section 54 is comprised of, for example, an MPL communication processing section 54A, an alarm processing section 54B, TL1 processing sections 54C, a user management section 54D, a 232C communication section 54E, and an X.25 communication section 54F, as shown in FIG. 25.

Upon receipt of fault information (i.e., alarm information; namely, fault occurrence information and fault recovery information) from the main signal unit control section 53, the MPL communication processing section 54A prepares, for example, a mail 54A-i (i=1 to n; n is a natural number), as shown in FIG. 28. By virtue of the mail 54A-i, the MPL communication processing section 54A notifies the alarm processing section 54B of the received alarm information. If the MPL communication processing section 54A has received a plurality of alarm information items, a plurality of mails 54A-i will be prepared, as can be seen from FIG. 28. The thus-prepared mails 54A-i are sent to the alarm processing section 54B while being linked together.

Upon receipt of the mail 54A-i (i.e., the alarm information) from the MPL communication processing section 54A, the alarm processing section 54B expands and stores the mail 54A-i in resources such as a memory within the interface processing section 54. The alarm processing section 54B prepares a fault history by sequentially registering the alarm information in a table 54G (i.e., a history table). The fault information is reported to the monitoring apparatus 50 on the basis of the thus-prepared fault history. The alarm processing section 54B is provided with a report communication section 54R. With reference to the table 54G, this report communication section 54R acquires alarm information to be reported to the monitoring apparatus 50 and provides such information to the user management section 54D.

The TL1 processing section 54C is prepared by the user management section 54D for every operator (user) who accesses to (or logs in) the user management section 54D through the network using a UNIX machine or the like. For example, if the user enters a password, one TL1 processing section 54C will be assigned to that user. The number of assignable TL1 processing sections 54C depends on a quantity of resources and the performance of the CPU.

The user management section 54D manages the state of communication between the transmission apparatuses 51-i and causes the TL1 processing sections 54C in the number corresponding to the number of users being in an accessed condition to operate. In cooperation with the TL1 processing sections 54C, the user management section 54D can simultaneously manage the communication with the plurality of users (including the monitoring apparatus 50).

The 232C communication section 54E and the X.25 communication section 54F receives the information (i.e., alarm information) from the user management section 54D and sends the thus-received information to the monitoring apparatus 50, in a format that complies with the communication scheme of the monitoring apparatus 50. Further, the 232C communication section 54E and the X.25 communication section 54F receive a request for the alarm information from the monitoring apparatus 50, in a format that complies with the communication to the user management section 54D. The information from the 232C communication section 54E and the X.25 communication section 54F and the information from the corresponding TL1 processing section 54C are exchanged via the user management section 54D.

More specifically, the above-described history table 54G has, for example, areas to be filled with information about "LOCATION OF FAULT," "FAULT (NAME OF THE FAULT)," "INFORMATION," "OCCURRENCE TIME," "RECOVERY TIME," "REPORT OF OCCURRENCE," and "REPORT OF RECOVERY," as shown in FIG. 26. When a fault occurs, the above-described areas are sequentially filled with the above-described various kinds of information from the first row.

The log capacity (N) of the history table 54G is set by the monitoring apparatus 50, as required. When the log capacity (N) has been fully filled, the history information may be deleted in chronological order from the oldest information. Alternatively, new history information may be written in the history table from the first row after the old information stored in the history table has been deleted completely.

The "LOCATION OF FAULT" designates the location of the main signal unit 52 where a fault has occurred. The name, etc., of the transmission apparatus in which the fault occurred is written into the "LOCATION OF FAULT" column after having been converted into a corresponding numerical value. The above-described "FAULT" designates the detail of the fault. In this example, the name of a fault is written into the "FAULT" column after having been converted into a corresponding numerical value. The above-described "INFORMATION (RELATED INFORMATION)" designates features of the detail of the fault. Detailed information, for example, a level (i.e., a facility) and an attribute (i.e., a severity) of a line, and the direction of a signal are written into the "INFORMATION" column after having been converted into numerical values.

The above-described "OCCURRENCE TIME" designates the time at which the fault has occurred. The "RECOVERY TIME" designates the time at which the fault has been corrected. A date and a time are written into each of these columns.

The above-described "REPORT OF OCCURRENCE" designates whether or not the occurrence of a fault has already been reported to the monitoring apparatus 50. If the occurrence of the fault has already been reported to the monitoring apparatus 50, "REPORTED," for example, is written into the "REPORT OF OCCURRENCE" column as information which represents the completion of report of the fault to the monitoring apparatus 50. In contrast, if the occurrence of the fault has not yet been reported to the monitoring apparatus 50, "UNREPORTED," is written into the "REPORT OF OCCURRENCE" column.

The above-described "REPORT OF RECOVERY" designates whether or not the monitoring apparatus 50 has been informed of the correction of the fault. As is the case of the "REPORT OF OCCURRENCE," if the correction of the fault has been reported to the monitoring apparatus 50, "REPORTED" is written into the "REPORT OF RECOVERY" column. In contrast, if the correction of the fault has not yet been reported to the monitoring apparatus 50, "UNREPORTED" is written into the "REPORT OF RECOVERY" column. Usually, fault information in rows whose "REPORT OF OCCURRENCE" or "REPORT OF RECOVERY" column is still filled with "UNREPORTED" is reported to the monitoring apparatus 50. However, if the monitoring apparatus 50 has requested the history, all the details provided on the history table 54G are reported as history information (LOG) to the monitoring apparatus 50.

More specifically, for example, if a fault having name K (hereinafter referred to as fault K) has occurred at time T1, the alarm processing section 54B writes "K" into the "FAULT" area and "T1" into the "OCCURRENCE TIME" area in the X-th row of the history table 54G, as shown in FIG. 27(a). In the state in which the occurrence of a fault has not yet been reported to the monitoring apparatus 50, "UNREPORTED" is written into the "REPORT OF RECOVERY" area as well as into the "REPORT OF OCCURRENCE" area.

When information about the correction of the fault K is reported from the main signal unit control section 53 at time T2, the alarm processing section 54B searches from the log table 54G a registration area related to the fault K in which the time (T1) has already been written. For example, as shown in FIG. 27(b), "T2" is written into the "RECOVERY TIME" area in the X-th row in which the information about the fault K has been written.

In the case where the occurrence of the fault K has been reported to the monitoring apparatus 50 but the correction of the fault K has not yet been reported to the monitoring apparatus 50, "REPORTED" is written into the "REPORT OF OCCURRENCE" area, and "UNREPORTED" is written into the "REPORT OF RECOVERY" area, as shown in FIG. 27(b). When the fault information is reported to the monitoring apparatus 50, the recovery information (recovery time "T2" and the like) which has not been reported is reported to the monitoring apparatus 50.

However, when a fault whose occurrence time has been written into the "OCCURRENCE TIME" area of the history table 54G is corrected, the above-described interface processing section (i.e., fault information management unit) 54 must search the history area in the history table 54G to which a recovery time is written. For this reason, as the log capacity (N) of the history table 54G becomes larger, it takes a longer time to search the history area, thereby resulting in delays in processing.

Further, if the main signal unit control section 53 is removed and inserted due to replacement or the like and is then restarted, there is a possibility that the main signal unit control section 53 finds, as a new fault, the fault that has already been reported to the interface processing section 54 and reports the fault again to the interface processing section 54. In this case, the information about he identical fault is written into the history table 54G of the interface processing section 54 in a duplicated manner. As a result, the identical fault information will be reported to the monitoring apparatus 50 in a duplicated manner.

To prevent the above-described duplication of the fault information, it is only necessary to check whether or not the fault information reported by the main signal unit 52 after restarting of the main signal unit control section 53 has already been written into the history table 54G. However, even in this case, the alarm processing section 54B must search all the fault information provided in the history table 54G. Similarly, as the log capacity (N) becomes larger, it takes a much longer time to search the fault information.

If an abnormality such as stoppage of the communication between the interface processing section 54 and the main signal unit control section 53 or destruction of the history table 54G occurs, information regarding faults that occurred in the main signal units 52 during such an abnormal state are not written into the history table 54G. In such a case, at the time of correction of the fault, it is necessary to search all the fault information provided in the history table 54G in order to check fault information missing from the history table 54G. Therefore, in this case as well, it takes a longer time to search the fault information as the log capacity (N) becomes larger.

Further, if a breakdown arises in the communication between the transmission apparatuses 51-i and the monitoring apparatus 50, or if any fault arises in the monitoring apparatus 50 itself, the interface processing section 54 sequentially stores in the history table 54G information regarding faults that occurred in the main signal unit 52 during the period of time in which communication with the monitoring apparatus 50 has been impossible. These information pieces, whose "REPORT OF OCCURRENCE" and "REPORT OF RECOVERY" columns are still filled with "UNREPORTED," are collectively reported to the monitoring apparatus 50 at the time of recovery.

Although the fault information provided on the history table 54G is recorded in order of occurrence (i.e., in order of points in time when faults occurred), recovery times are recorded in random. As a result, contents of "REPORT OF RECOVERY" column are provided in the order differing from the order of actual points in time when the faults were corrected. To prevent this problem, the interface processing section 54 must carry out complicated sorting operations, thereby resulting in considerable delay in reporting the recovery to the monitoring apparatus 50.

If the MPL communication processing section 54A of the interface processing section 54 receives a report (i.e., alarm information) from the main signal unit control section 53, as previously described with reference to FIG. 28, the thus-received alarm information is sent to the alarm processing section 54B by means of the mail 54A-i. However, if a large number of reports are received from the main signal unit control section 53, a large number of mails 54A-i are sent to the alarm processing section 54B while being linked together. As a result, memory resources for storing (or expanding) the mails 54A-i are exhausted due to the delays in such processing as previously described; i.e., processing from the preparation of a history carried out by the alarm processing section 54B to the report of the alarm information to the monitoring apparatus 50.

More specifically, in the above-described interface processing section 54, the alarm processing section 54B carries out the preparation of the history table 54G and report of the fault information to the monitoring apparatus 50 in the form of a series of operation. Consequently, if the preparation of the history table 54G is delayed, the report of fault information to the monitoring apparatus 50 will be also delayed. Therefore, storage resources for holding the mails 54A-i are exhausted, which makes it difficult to completely notify the alarm processing section 54B of the information about all of the faults reported by the main signal unit control section 53.

SUMMARY OF THE INVENTION

The present invention has been conceived in view of the aforementioned problems, and an object of the present invention is to provide a fault information management apparatus and a fault information management method, which allow processing for preparing a history of faults and processing for reporting information regarding the faults to be carried out independently of each other, so that the fault history preparation processing can be speeded up so as to efficiently carry out the two kinds of processing at a high speed.

To this end, the present invention provides a fault information management apparatus which is used with a transmission apparatus for sending information in a network, and which manages information related to faults that occurred in the transmission apparatus and provides the fault information to a monitoring apparatus for the transmission apparatus, the fault information management apparatus comprising a fault history preparation section which, upon receipt of the fault information, prepares a fault history for the monitoring apparatus; and a report processing section which, on the basis of the fault history prepared by the fault history preparation section and independently of fault history preparation processing carried out by the fault history preparation section, carries out processing for reporting the fault information to the monitoring apparatus.

Further, the present invention provides a fault information management method for use in a fault information management apparatus used with a transmission apparatus for sending information in a network and adapted to manage information related to faults that occurred in the transmission apparatus, and provides the fault information to a monitoring apparatus for the transmission apparatus, the fault information management method comprising the steps of: preparing, upon receipt of the fault information, a fault history to be sent to the monitoring apparatus; preparing, independently of the fault history, report information required to notify the monitoring apparatus of the faulty information; and performing processing for reporting the fault information to the monitoring apparatus, on the basis of the report information and independently of the processing for the preparation of the fault history.

Consequently, according to the fault information management apparatus and the fault information management method of the present invention, a fault history to be sent to a monitoring apparatus is prepared upon receipt of fault information. Independently of the fault history, report information required to report the fault information to the monitoring apparatus is prepared. Processing for reporting the fault information to the monitoring apparatus is carried out on the basis of the report information, independently of the preparation of the fault history. As a result, both the operations can be correctly and quickly carried out. Consequently, it is possible to completely notify the monitoring apparatus of received fault information, which in turn enables considerable improvements in the processing performance of monitoring system.

BRIEF DESCRIPTION OF THE DRAWINGS

FIG. 9 is a schematic representation showing the configuration of a fault name table according to the embodiment of the present invention;

FIG. 26 is a schematic representation showing the configuration of the history table;

FIGS. 27(a) and 27(b) are schematic representations showing examples of the fault information registered in the history table.

DESCRIPTION OF THE PREFERRED EMBODIMENTS

(a) Description of an Aspect of the Present Invention

To begin with, an aspect of the present invention will be described with reference to the accompanying drawings.

Figure 1:
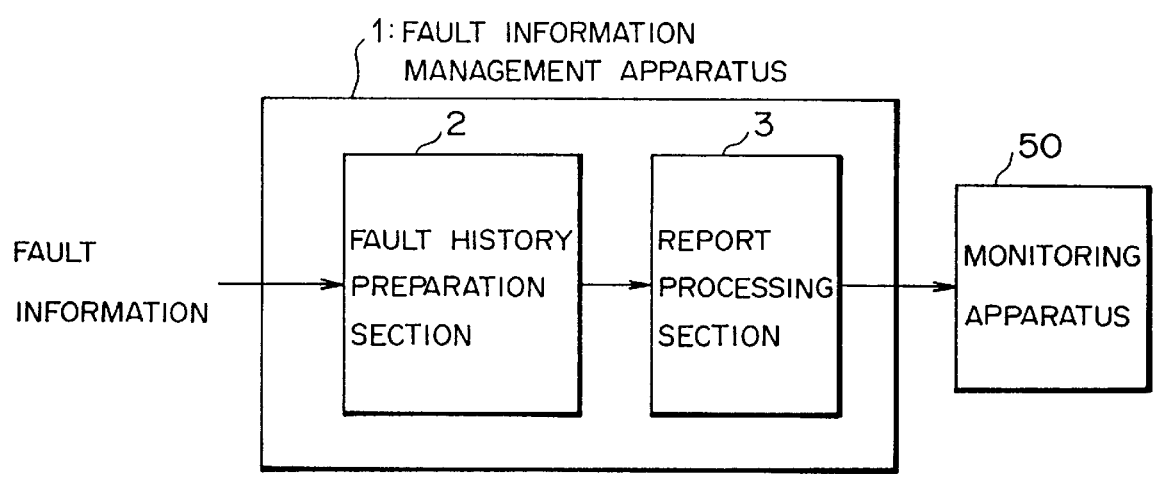
FIG. 1 is a block diagram showing an aspect of the present invention.

FIG. 1 is a block diagram showing an aspect of the present invention. A fault information management apparatus 1 shown in FIG. 1 is used in a transmission apparatus for transmitting information in a network. The fault information management apparatus 1 is capable of managing information about faults that occurred in the transmission apparatus and of providing the fault information to a monitoring apparatus 50 for the transmission apparatus. The fault information management apparatus 1 is provided with a fault history preparation section 2 and a report processing section 3, each being independent of the other.

Upon receipt of the fault information, the fault history preparation section 2 prepares a fault history for the monitoring apparatus 50. On the basis of the fault history prepared by the fault history preparation section 2 and independently of the preparation of the fault history carried out by the fault history preparation section 2, the report processing section 3 carries out processing for report of the fault information to the monitoring apparatus 50.

That is, upon receipt of the fault information, the fault information management apparatus 1 prepares a fault history for the monitoring apparatus 50. Further, independently of the fault history, the fault information management apparatus 1 prepares report information required to report the fault information to the monitoring apparatus 50. The fault information management apparatus 1 is designed so as to be able to carry out processing for report of the fault information to the monitoring apparatus 50 on the basis of the thus-prepared report information, independently of the preparation of the fault history.

According to the above-described fault information management apparatus 1 and fault information management method, a fault history for the monitoring apparatus 50 is prepared upon receipt of the fault information. The report information required to notify the monitoring apparatus 50 of the fault information is prepared independently of the fault history. Based on the thus-prepared report information, the processing for report of the fault information to the monitoring apparatus 50 is carried out independently of the preparation of the fault history. As a result, the preparation of the fault history and the preparation of report information can be correctly and quickly carried out. Therefore, it is possible to notify the monitoring apparatus 50 of received information about all of the faults, and the processing capability of the monitoring apparatus can be significantly improved.

More specifically, the above-described fault history preparation section 2 is comprised of the following elements:

a history table for holding fault occurrence information received when a fault has arisen in the transmission apparatus and fault recovery information received when the fault has been corrected, in the form of a pair of information pieces;

a fault occurrence table for holding a registration position of the fault occurrence information on the history table; and a fault information processing section for controlling registration process of the fault occurrence information and fault recovery information into the history table, and registration process of the registration position of the fault occurrence information on the history table into the fault occurrence table.

The fault information processing section is designed so that the fault information processing section registers the fault occurrence information to a corresponding area of the history table upon receipt of the fault occurrence information, register the registration position of the fault occurrence information to the fault occurrence table, and registers the fault recovery information into the corresponding area of the history table designated by the registration position by reference to the fault occurrence table, upon receipt of the fault recovery information as a result of correction of the fault.

Therefore, according to the fault information management apparatus 1 of the present invention, fault occurrence information is registered to a corresponding area on the history table upon receipt of the fault occurrence information. The registration position is registered to the fault occurrence table. Upon receipt of fault recovery information as a result of correction of the fault, with reference to the fault occurrence table, fault recovery information is registered to the corresponding area on the history table designated by the registration position. Consequently, it is possible to reduce the time required to search the position of the history table to which the fault recovery information is registered when the fault is corrected. Further, it is possible to quickly perform processing for logging the fault recovery information.

Furthermore, the above-described fault information processing section has a structure such that when the fault recovery information is registered into the corresponding area on the history table, the registration position registered in the fault occurrence table is reset. Moreover, when the fault occurrence information is registered in the history table, the fault occurrence table is referred to. If the registration position regarding the same type of fault occurrence information has already been registered, the fault occurrence information is not registered in the history table.

According to the above-described fault information management apparatus 1 of the present invention, if the fault recovery information is registered in the corresponding area of the history table, the registration position that is registered in the fault occurrence table will be reset. Therefore, it is possible to clearly ascertain the occurrence and recovery of faults.

When the fault occurrence information is registered in the history table, the fault occurrence table is referred. If the same type of fault occurrence information has already been registered, it will be possible to prevent the fault occurrence information from being registered in the history table. As a result, the identical information is not registered in the history table in a duplicated manner, and therefore the amount of resources required by the history table can be reduced to minimum.

The fault information processing section is designed so as to register the fault occurrence information and the fault recovery information in the corresponding areas of the history table if the registration position of the fault occurrence information has not been registered in the fault occurrence table when fault occurrence information is received.

According to the aforementioned fault information management apparatus 1 of the present invention, if the registration position of the fault occurrence information has not yet been registered in the fault occurrence table when the fault recovery information is received, the fault occurrence information and the fault recovery information are registered in the corresponding areas of the history table. As a result, it is possible to correctly register the information about all the faults in the history table. It is possible to notify the fault information to the monitoring apparatus 50, thereby contributing to significant improvements in the reliability of the fault information management apparatus.

The above-described fault history preparation section 2 may comprise the following elements:

a history table for holding fault occurrence information received when a fault has arisen in the transmission apparatus and fault recovery information received when the fault has been corrected, in the form of a pair of information pieces;

a registration order table for holing the registration order of the fault occurrence information and the fault recovery information in the history table; and a fault information processing section for controlling registration process of the fault occurrence information and fault recovery information into the history table, and registration process of the registration order into the registration order table.

In this case, the report processing section 3 is designed so as to notify the monitoring apparatus 50 of the fault occurrence information or the fault recovery information on the basis of the previously described registration order table in the order in which the information is registered in the history table.

The fault history preparation section 2 may be further provided with a next registration position holding section for holding a registration position on the registration order table with regard to registration order information to be subsequently registered in the registration order table. In this case, the fault information processing section is designed so as to register the registration order information in the area on the registration order table designated by the registration position which is registered in the next registration position holding section. Further, the fault information processing section registers the next registration position on the registration order table in the next registration position holding section.

According to the fault information management apparatus 1 of the present invention, registration order information is registered in the area on the registration order table designated by the registration position which is registered in the next registration position holding section. Further, the next registration position on the registration order table is registered in the next registration position holding section. As a result, it is possible to automatically register faults and correction of the faults in order.

The fault history preparation section 2 may be further provided with a final registration position holding section for holding a registration position on a registration order table with regard to the registration order information finally registered in the registration order table. In this case, the report processing section 3 is designed so as to fetch from the history table the fault occurrence information or the fault recovery information corresponding to the registration order information retained in the area of the registration order table designated by the registration position which is registered in the final registration position holding section. The thus-fetched fault occurrence information or fault recovery information is reported to the monitoring apparatus 50.

According to the fault information management apparatus 1 of the present invention, the fault occurrence information or the fault recovery information is fetched from the history table. More specifically, the fault occurrence information or the fault recovery information corresponds to the registration order information held in the area of the registration order table designated by the registration position which is registered in the final registration position holding section. The thus-fetched fault occurrence information or the fault recovery information is reported to the monitoring apparatus 50. Consequently, it becomes possible for the monitoring apparatus 50 to automatically and correctly ascertain the information.

The fault history preparation section 2 may be further provided with the next registration position holding section and the final registration position holding section. In this case, the above-described fault information processing section is designed so as to register registration order information in the area on the registration order table designated by a registration position registered in the next registration position holding section. Further, the fault information processing section registers the next registration position on the registration order table in the next registration position holding section. If the registration position registered in the final registration position holding section is different from the registration position registered in the next registration position holding section, the report processing section 3 will fetch from the history table the fault occurrence information or the fault recovery information corresponding to pieces of the registration position information the number of which corresponds to the difference between the registration positions. The thus-fetched information is reported to the monitoring apparatus 50.

According t o the above-described fault information management apparatus 1 of the present invention, if the registration position registered in the final registration position holding section is different from the registration position registered in the next registration position holding section, the fault occurrence information or the fault recovery information corresponding to pieces of the registration position information the number of which corresponds to the difference between the registration positions will be fetched from the history table. The thus-fetched information is reported to the monitoring apparatus 50. As a result, it is possible to easily ascertain the information which has not yet been reported to the monitoring apparatus 50. Further, all the fault information pieces which have been logged can be correctly reported to the monitoring apparatus 50.

The above-described fault history preparation section 2 may be further provided with the following elements:

a history table for holding fault occurrence information received when a fault has arisen in the transmission apparatus and fault recovery information received when the fault has been corrected, in the form of a pair of information pieces;

a fault occurrence table for holding a registration position of the fault occurrence information on the history table:

a registration order table for holding the registration order of the fault occurrence information and the fault recovery information in the history table; and a fault information processing section for controlling registration process of the fault occurrence information or fault recovery information into the history table, registration process of the registration position in the fault occurrence table, and registration process of the registration order into the registration order table.

However, in this case, the report processing section 3 is designed so as to notify the monitoring apparatus 50 of the fault occurrence information or the fault recovery information on the basis of the previously described registration order table in the order in which the information is registered in the history table.

Even in such a case, the fault information processing section is designed so as to register the fault occurrence information in the corresponding area of the history table upon receipt of information about occurrence of a fault. Further, the fault information processing section further registers the registration position in the fault occurrence table. Upon receipt of fault recovery information as a result of the correction of the fault, the fault occurrence table is referred. The fault recover information is registered in the corresponding area on the history table designated by the registration position.

According to the fault information management apparatus 1 of the present invention, the fault occurrence information is registered in the corresponding area on the history table upon receipt of the fault occurrence information. The registration position is registered in the fault occurrence table. If the fault recovery information is received as a result of correction of the fault, the fault occurrence table will be referred. Then, the fault recovery information is registered in the corresponding area on the history table designated by the registration position. In consequence, it is possible to save the time required to search a position of the history table, to which the fault recovery information is registered, at the time of correction of the fault. As a result, it is possible to log the fault recovery information quickly.

Similarly, the above-described fault information processing section is designed so as to reset the registration position registered in the fault occurrence table if the fault recovery information is registered in the corresponding area of the history table. When the fault occurrence information is registered in the history table, the fault occurrence table is referred. If the registration position of the fault occurrence information of the same type has already been registered, the current fault occurrence information will not be registered in the history table.

Further, according to the above-described fault information management apparatus 1 of the present invention, if the fault recovery information is registered in the corresponding area of the history table, the registration position registered in the fault occurrence table is reset. As a result, it is possible to clearly ascertain the occurrence and correction of a fault.

When the fault occurrence information is registered in the history table, the fault occurrence table is referred. If the fault occurrence information of the same type has already been registered in the fault occurrence table, the current fault occurrence information will not be registered in the history table. As a result, the identical information is prevented from being registered in the history table in a duplicated manner, which in turn makes it possible to minimize the quantity of resource required by the history table.

The fault information processing section is designed so as to register the fault occurrence information and the fault recovery information in the corresponding area of the history table if the registration position of the fault occurrence information has not yet been registered in the fault occurrence table at the time when information about correction of the fault is received.

According to the above-described fault information management apparatus 1 of the present invention, the fault occurrence information and the fault recovery information will be registered in the corresponding area of the history table if the registration position of the fault occurrence information has not yet been registered in the fault occurrence table at the time when the information about correction of the fault is received. Therefore, it is possible to correctly register the information about all the faults in the history table. Further, such information can be reported to the monitoring apparatus 50, which in turn contributes to improvements in the reliability of the fault information management apparatus 1.

The above-described fault history preparation section 2 may be provided with the next registration position holding section and the final registration position holding section. In this case, the fault information processing section registers the registration order information in the registration order table designated by the registration position registered in the next registration position holding section. Further, the fault information processing section registers the next registration position on the registration order table in the next registration position holding section. If the registration position registered in the final-registration position holding section is different from the registration position registered in the next registration position holding section, the report processing section 3 will fetch the fault occurrence information or the fault recovery information corresponding to pieces of the registration position information the number of which corresponds to the difference between the registration positions from the history table. The thus-fetched information is reported to the monitoring apparatus 50.

According to the above-described fault information management apparatus 1 of the present invention, if the registration position registered in the final registration position holding section is different from the registration position registered in the next registration position holding section, the fault occurrence information or the fault recovery information corresponding to pieces of the registration position information the number of which corresponds to the difference between the registration positions will be fetched from the history table. The thus-fetched information is reported to the monitoring apparatus 50. Consequently, it is possible to easily ascertain the information which has not yet been reported to the monitoring apparatus 50. Further, the information about all of the logged faults can be correctly reported to the monitoring apparatus 50.

(b) Description of One Embodiment of the Present Invention

An embodiment of the present invention will now be described with reference to the drawings.

(A) Description of Fault Information

Figure 22:
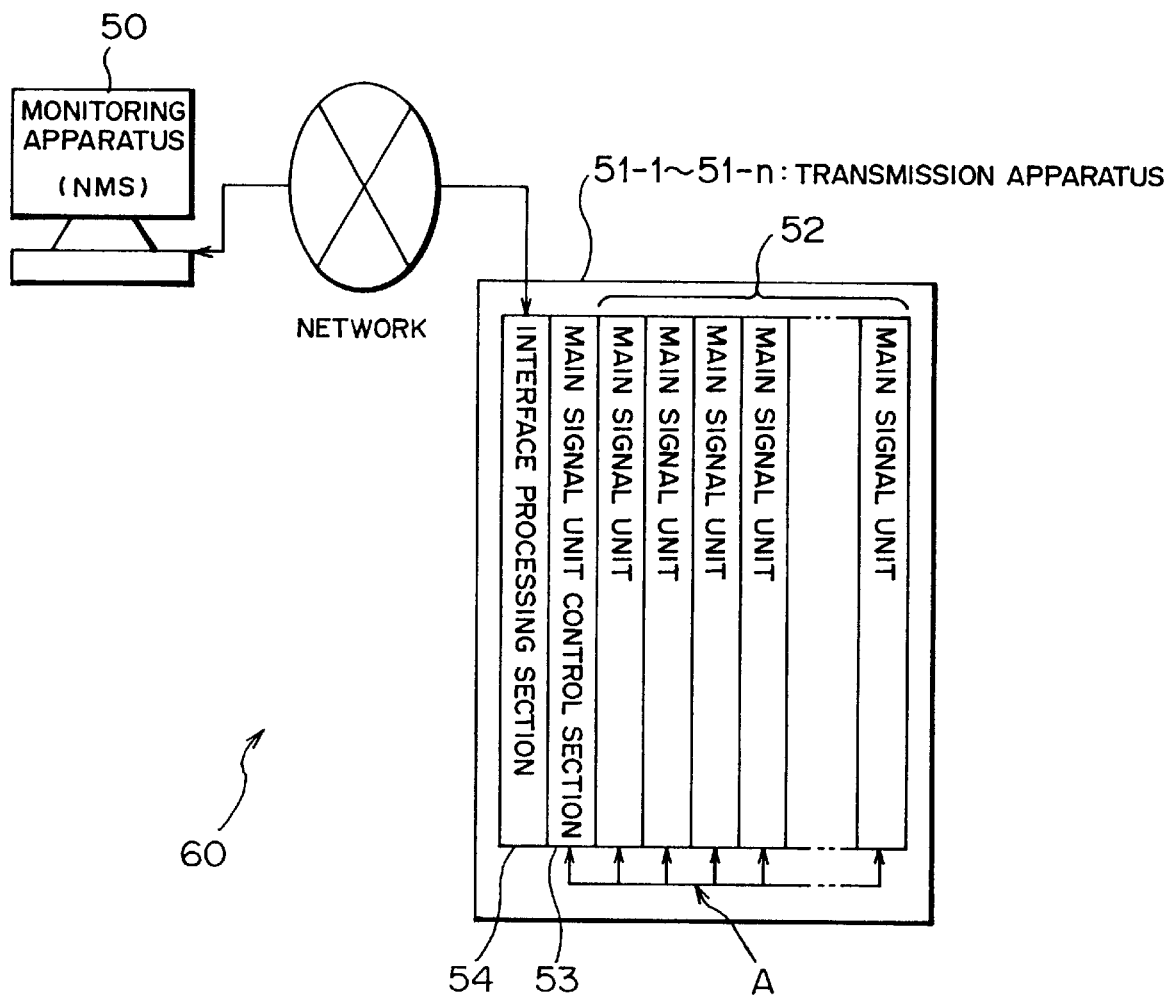
FIG. 22 is a block diagram for showing one example of an internal configuration of the transmission apparatus.

To begin with, a detailed description will be given of possible faults that may arise in a main signal unit 52 within a transmission apparatus 51-i (see FIG. 22), to which a fault information management apparatus (an interface processing section) according to one embodiment of the present invention is applied.

Figure 2:
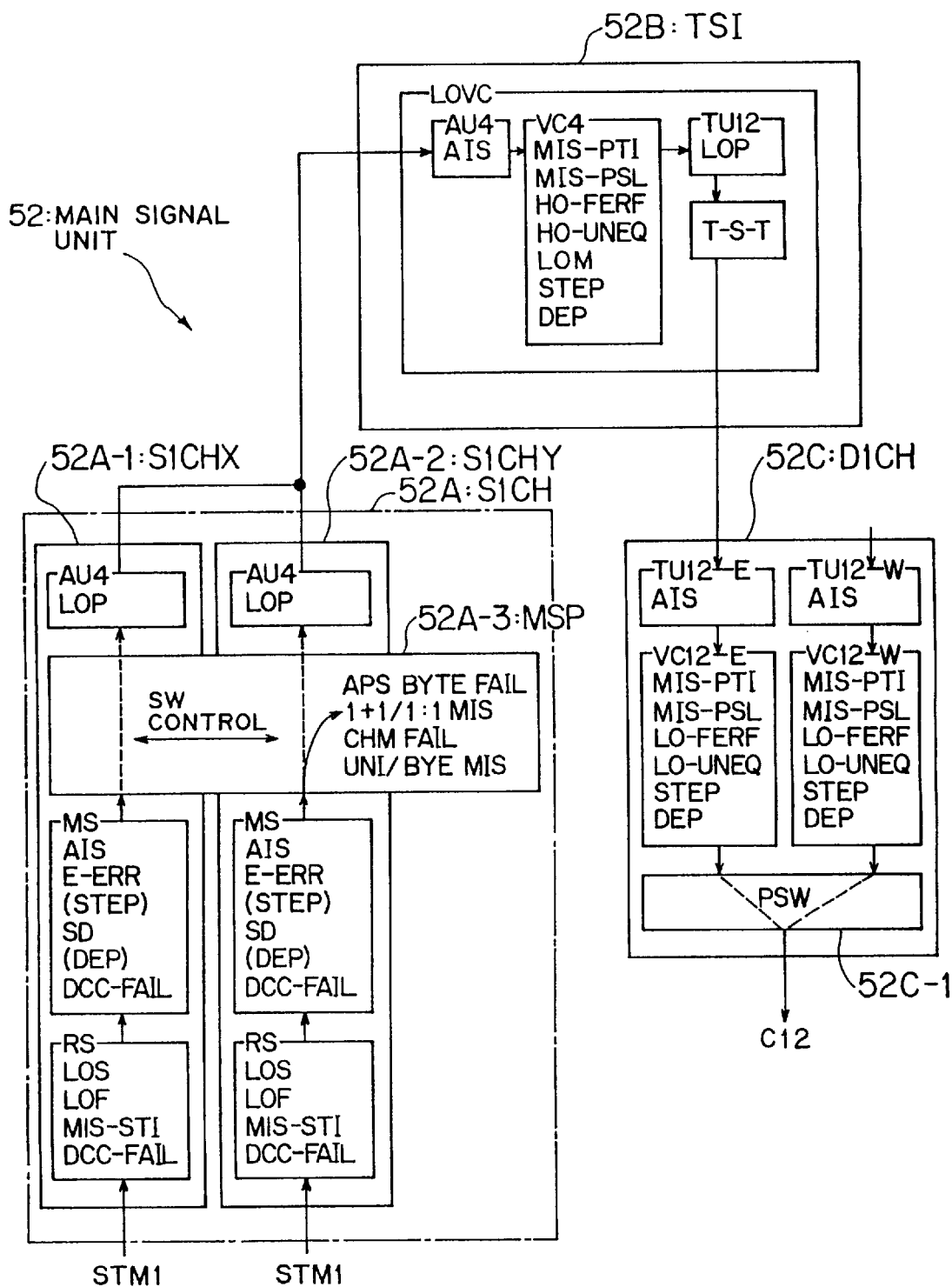
FIG. 2 is a block diagram for explaining fault information generated in a transmission apparatus (a main signal unit) according to one embodiment of the present invention.

FIG. 2 is a block diagram showing the configuration of the main signal unit 52. The main signal unit 52 is comprised of an optical unit (S1CH) 52A, a line-connection-and-multiplexing unit (TSI) 52B, and a D12 channel unit (D1CH) 52C, as shown in FIG. 2. These elements correspond to STM1 optical units 52a, TSI units 52c, and D12 channel units 52e shown in FIG. 23.

The optical unit 52A terminates an SOH (Section-Over-Head) portion of a multiplexed frame used in SDH transmission. For example, on the assumption that an STM1 frame is used as an input multiplexed frame, the STM1 frame is disassembled in units of AU4 level as a result of termination of the SOH portion of the STM1 frame. The main signal unit 52 is provided with a main optical unit (S1CHX) 52A-1 and a spare optical unit (S1CHY) 52A-2 as the optical units 52A.

The optical unit 52A is designed so as to carry out switching between the main optical unit 52A-1 and the spare optical unit 52A-2 by means of a switch control section (MSP) 52A-3. For example, if the main optical unit 52A-1 fails to operate due to an abnormality or the like, the switch control section 52A-3 will carry out a switching operation. As a result, the spare optical unit 52A-2 operates in lieu of the main optical unit 52A-1.

The optical unit 52A is designed so as to check faults in each section by analyzing (or terminating) an RSOH (Regenerator Section Over Head) which is an over-head of a relay section and an MSOH (Multiplex Section Over Head) which is an over-head of a multiplexing (terminal) section, during the course of disassembly of the STM1 frame into units of the AU4 level, as previously described.

For example, possible faults (or alarms) which will be detected from the RSOH portion during the course of the termination processing include "LOS," "LOF," "MIS-STI," "DCC-FAIL," or the like. "LOS" is an alarm representing the interruption of input of an optical signal (i.e., the STM1 frame). "LOF" is an alarm which represents an asynchronous state of the STM1 frame. "LOS" and "LOF" are issued when A1 byte and A2 byte inserted into the RSOH as a fixed bit pattern cannot be detected.

"MIS-STI" is an alarm representing an error in tracing an RS section. When the names of connected apparatuses are transmitted to each other in the form of arbitrary character string (e.g., ASCII codes) between the transmission apparatuses 51-i using L1 byte of the RSOH, a transmission value and an expected receipt value are set to the sending and receiving sides, respectively. If the difference between the actually-received value and the expected receipt value is detected at the receiving side, "MIS-STI" will be detected. "DCC-FAIL" represents an anomalous communication state of LAPD (Link Access Procedure on the D--channel).

In short, the RSOH holds chiefly operation and maintenance information for monitoring erroneous connection of optical cables. The above-described various alarms are issued as a result of termination (or monitoring) of the RSOH.

Possible alarms which will be detected by the MSOH include "AIS," "E-ERR," "STEP," "SD," "DEP," "DCC-FAIL," or the like. "AIS" is an alarm for reporting the occurrence of a breakdown of transmission of a signal with respect to the transmission apparatuses 51-i disposed ahead of (or in a downstream direction of) the sending-side transmission apparatus 51-i. The "AIS" is detected if a signal to be sent to the transmission apparatuses 51-i ahead of the sending-side transmission apparatus 51-i become undefined after "LOS" or another alarm has been received.

The foregoing "E-ERR," "STEP," "SD," and "DEP" are alarms representing a degraded state of a signal. "E-ERR" is issued when it is found by parity check carried out using B2 byte of the MSOH that the number of errors (i.e., parity errors) in the optical signal exceeds a fixed value (or a threshold value) momentarily (or within a period of one second). As is the case of the "E-ERR," "SD" is issued when it is found by the parity check carried out using B2 byte of the MSOH that the number of parity errors exceeds a threshold value which is smaller than that of the "E-ERR."

"STEP" is issued when the number of parity errors is continuously in excess of a threshold value, which is much smaller than the threshold values of the "E-ERR" and "SD," for more than 10 seconds. "DEP" is issued when the cumulative number of errors which are less serious than the errors for "STEP" exceeds a threshold value within, e.g., every 15 min. or 24 hrs. More specifically, the "STEP" and "DEP" are issued, in principle, when a receiving state of noise rather than the breakdown of a signal continues for a long period of time.

Another possible alarm which will be detected at the AU4 level is "LOP" representing disconnection (loss) of an AU4 pointer. The "LOP" is detected when a pointer is operated after SOH has been terminated. The above-described alarms represent faults in the signal received from an optical cable.

In addition to the foregoing alarms, there are "APS BYTE FAIL," "CHM FAIL," etc., which may be detected by the MSOH, as can be seen from FIG. 2. If any one of these alarms is detected, the switching between the main optical unit and the spare optical unit is carried out. Of these alarms, "APS BYTE FAIL" is issued when an undefined code is received from the opposite-side transmission apparatus through exchange of information between the sending-side transmission apparatus and the opposite-side transmission apparatus using a code [APS (Automatic Protection Switch) byte].

The multiplexing unit 52B controls (or cross-connects) multiplexed frames exchanged between the optical unit 52A and the D12 channel unit 52C in units of TU12 (VC12) using a three-stage switch (T-S-T) made up of combination of time switches (T) and a space switch (S). The signal received from the optical unit 52A in units of AU4 is disassembled into signals in units of VC4 by pointer processing (i.e., by removal of the AU4 pointers from the frame). These signals are further disassembled into signals in units of TU12, and the thus-disassembled signals are output to the D12 channel unit 52C. Conversely, the signals received from the D12 channel unit 52C in units of TU12 are multiplexed to signals in units of VC4. AU4 pointers are added to these signals, whereby the signals are output to the optical unit 52A in units of AU4.

"AU AIS" is a possible alarm which will be detected through the processing associated with the AU4 pointer. This "AU AIS" is an alarm that is detected when an AIS signal is received at the AU4 level. This alarm represents the occurrence of a breakdown of signal transmission at the AU4 level in the transmission apparatuses 51-i provided ahead of the sending-side transmission apparatus 51-i. When the signal formed in units of VC4 is disassembled into signals formed in units of TU12, "MIS-PIT," "MIS-PSL," "HO-FERF," "HO-UNEQ," "LOM," "STEP," "DEP," or the like may be detected by means of a pass-over-head (POH) of VC4.

The "MIS-PTI" is an alarm which represents a tracing error at the VC4 level. When an arbitrary character string is transmitted between the transmission apparatuses 51-i using J1 byte contained in the POH of VC4, a transmission value and an expected receipt value are set to the sending and receiving sides, respectively. If the difference between the actually-received value and the expected receipt value is detected at the receiving side, "MIS-PTI" will be detected.

The "MIS-PSL" is an alarm representing an anomalous state of a C2 byte (a pass signal label) which is also contained in the POH of VC4. If the construction of a signal up to the VC4 level (i.e., a mapping configuration of VC4) is different from an expected receipt value, "MIS-PSL" is detected. "HO-FERF" is used to display on the sending-side transmission apparatus 51-i alarm information including the result of a parity check carried out by the opposite-side transmission apparatus 51-i at the VC4 level (i.e., a parity error).

The "HO-UNEQ" is an alarm which is detected when the C2 byte is "0." This "HO-UNEQ" represents that there is no meaningful signal in VC4 (i.e., a payload is not housed in VC4). "LOM" is an alarm to be detected when a TU signal in VC4 is interrupted. "STEP" is an alarm which is issued when the result of a parity check (or the number of parity errors) regarding B3 byte contained in the POH of VC4 is continuously in excess of a certain threshold value for more than 10 seconds. "DEP" is issued when the cumulative number of errors which are less serious than the errors for the "STEP" exceeds a certain threshold value within, e.g., every 15 min. or 24 hrs.

The signals disassembled in units of TU12 are cross-connected [i.e., subjected to switching between slots (or channels)] by the T-S-T switch on the basis of a TU pointer such that each channel information is transmitted to a corresponding transmission apparatus 51-i. At this time, if the TU12 pointer is in a stopped state, "LOP (Loss of Pointer)" will be detected. All of these alarms associated with the multiplexing unit 52B are detected when the signal formed in units of AU4 (or VC4) is disassembled into signals formed in units of TU12. However, they will not be detected in a reverse direction; namely, they will not be detected when the signal formed in units of TU12 is assembled to a signal formed in units of AU4 (VC4).

The D12 channel unit 52C shown in FIG. 2 disassembles the TU12 signal received from the multiplexing unit 52B into VC12 on the basis of a TU 12 pointer. Then, the D12 channel unit 52C carries out an SW control (i.e., switching between paths) in units of VC12 and then outputs the signal, as a C12 signal of the PDH which is the smallest container, outside of the transmission apparatus. Meanwhile, the D12 channel unit 52C constructs a TU12 signal from the C12 signal of the PDH and sends the thus-constructed TU12 signal to the multiplexing unit 52B. As can be seen from FIG. 2, the D12 channel unit 52C can carry out the above-described operations using two routes.

It is possible to process a TU12 (VC12) signal corresponding to one optical unit 52A by use of one of these two routes. As a result, it is possible to cope with the case where another optical unit 52A is added to the free area 52b, as previously described with reference to FIG. 23.

The D12 channel unit 52C is usually designed so as to be able to process the TU12 signals in the number corresponding to 21 channels. Therefore, if three D12 channel units 52C are attached to the transmission apparatus, it will be possible to process all of the TU12 signals (up to 63 corresponding to 63 channels) that are multiplexed in VC4.

A better-quality signal of the VC12 signals output through the routes is selectively output by a PSW (a path switch selecting section) 52C-1. If a fault arises in any one of the two routes, the VC12 signal output from the normal route is output via the path switch selecting section 52C-1.

"TU AIS" is a possible alarm which will be detected in disassembling the TU12 signal into the VC12 signal on the basis of the TU12 pointer. The "TU AIS" is an alarm which is detected when the AIS signal in the TU12 level is received. This alarm means that a breakdown of the transmission of the TU12 signal occurred in the transmission apparatuses provided ahead of the sending-side transmission apparatus 51-i.

In contrast, possible alarms which will be detected in the VC12 level are "MIS-PTI," "MIS-PSL," "LO-FERF," "LO-UNEQ," "STEP," "DEP," or the like. "MIS-PTI" is an alarm which represents errors in tracing the VC12 signal (i.e., faults associated with a tracing mismatch). Similar to the above-described "MIS-PTI" in the VC4 level, "MIS-PTI" will be issued if the difference between J2 byte of the actually received VC12 and an expected receipt value is detected. The "MIS-PSL" is an alarm which represents an anomalous state of a signal label provided in V5 byte of the VC12 signal for defining the type of the VC12. "MIS-PSL" is detected when the signal level is undefined.

"LO-FERF" is alarm information for displaying on the sending-side transmission apparatus 51-i the result of a parity check in the VC12 level carried out by the opposite-side transmission apparatus 51-i (i.e., the number of parity check errors). The "LO-FERF" represents the same faults as those designated by the above-described "HO-FERF" in the VC4 level. The "LO-UNEQ" represents that the VC12 signal is meaningless (i.e., a payload is not housed). The "LO-UNEQ" is detected when a corresponding bit in the V5 byte of the VC12 signal is "0."

Similar to "STEP" of the above-described optical unit 52A, the "STEP" is an alarm which is issued when the number of parity errors is continuously in excess of a certain small threshold value for more than 10 seconds. At this time, the parity errors are detected by BIP-2 (Bit Interleaved Parity 2) operation using the V5 byte of the VC12 signal.

Similar to "DEP" of the above-described optical unit 52A, the "DEP" is an alarm which is issued when the cumulative number of parity errors which are less serious than the errors for the "STEP" exceeds a certain threshold value within, e.g., every 15 min. or 24 hrs. At this time, the number of parity errors is detected by the BIP-2 operation using the V5 byte of the VC12 signal.

In addition, there are other possible alarms which will be detected in the VC12 level signal; namely, "BIP MJ" and "BIP MN." "BIP MJ" is an alarm equivalent with the "E-ERR" in the above-described optical unit 52A. "BIP MN" is an alarm equivalent with the "SD" in the above-described optical unit 52A. These alarms are detected when the number of parity errors which is obtained as a result of the BIP-2 operation using the V5 byte, exceeds a certain threshold value.

Common alarms which are issued with respect to all of the components in the main signal unit 52 are "EQPT-FAIL" and "MISMNT A." "EQPT-FAIL" is an alarm which represents that a failure in an LSI (Large-Scale Integration) or stoppage of a clock signal used in each unit. In short, "EQPT-FAIL" represents failures in the unit itself. "MISMNT A" is an alarm which represents erroneous mounting of a unit.

(B) Description of the Interface Processing Section

Figure 3:
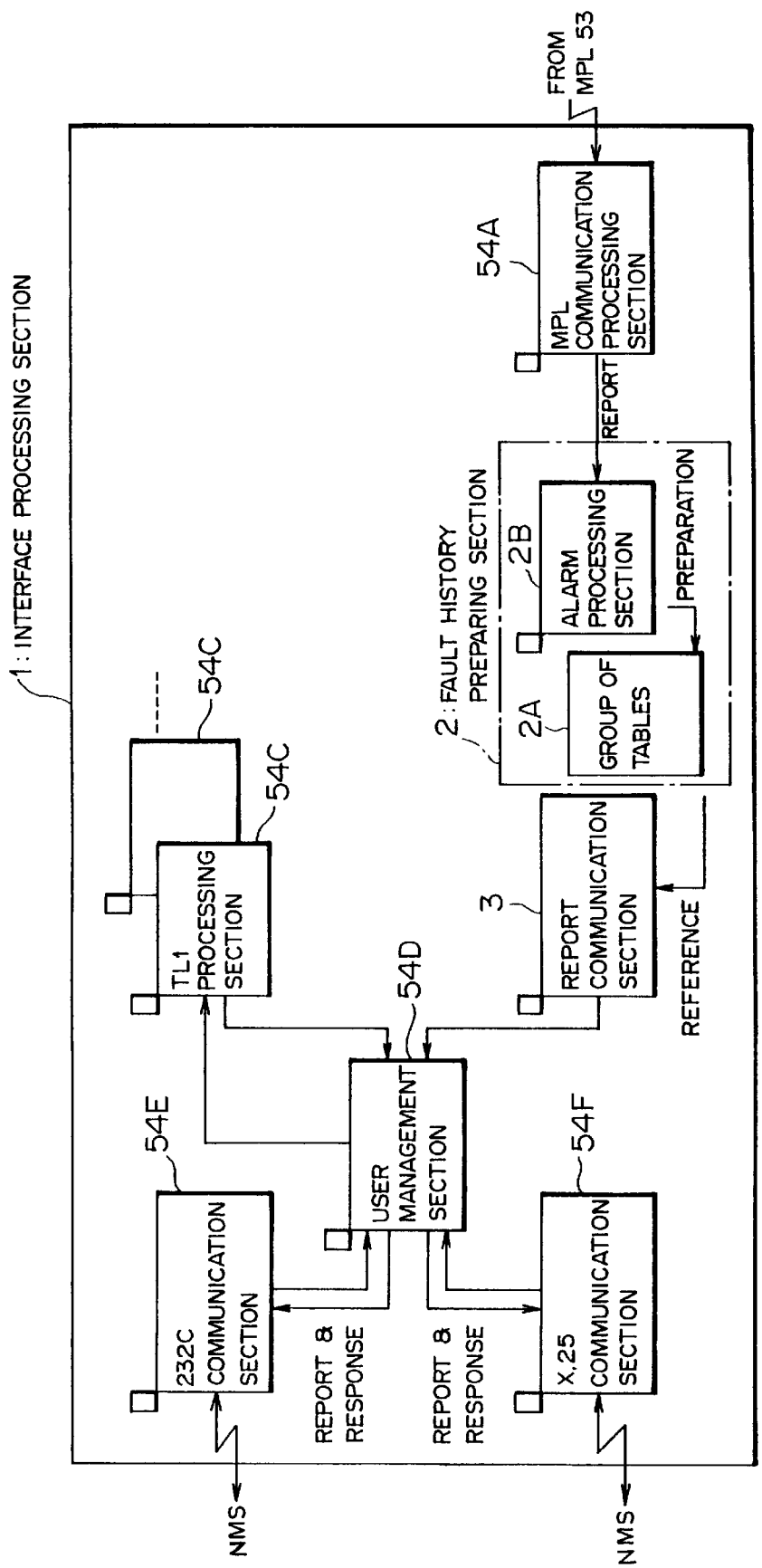
FIG. 3 is a block diagram showing the configuration of an interface processing section which acts as a fault information management apparatus according to the embodiment of the present invention.
Figure 25:
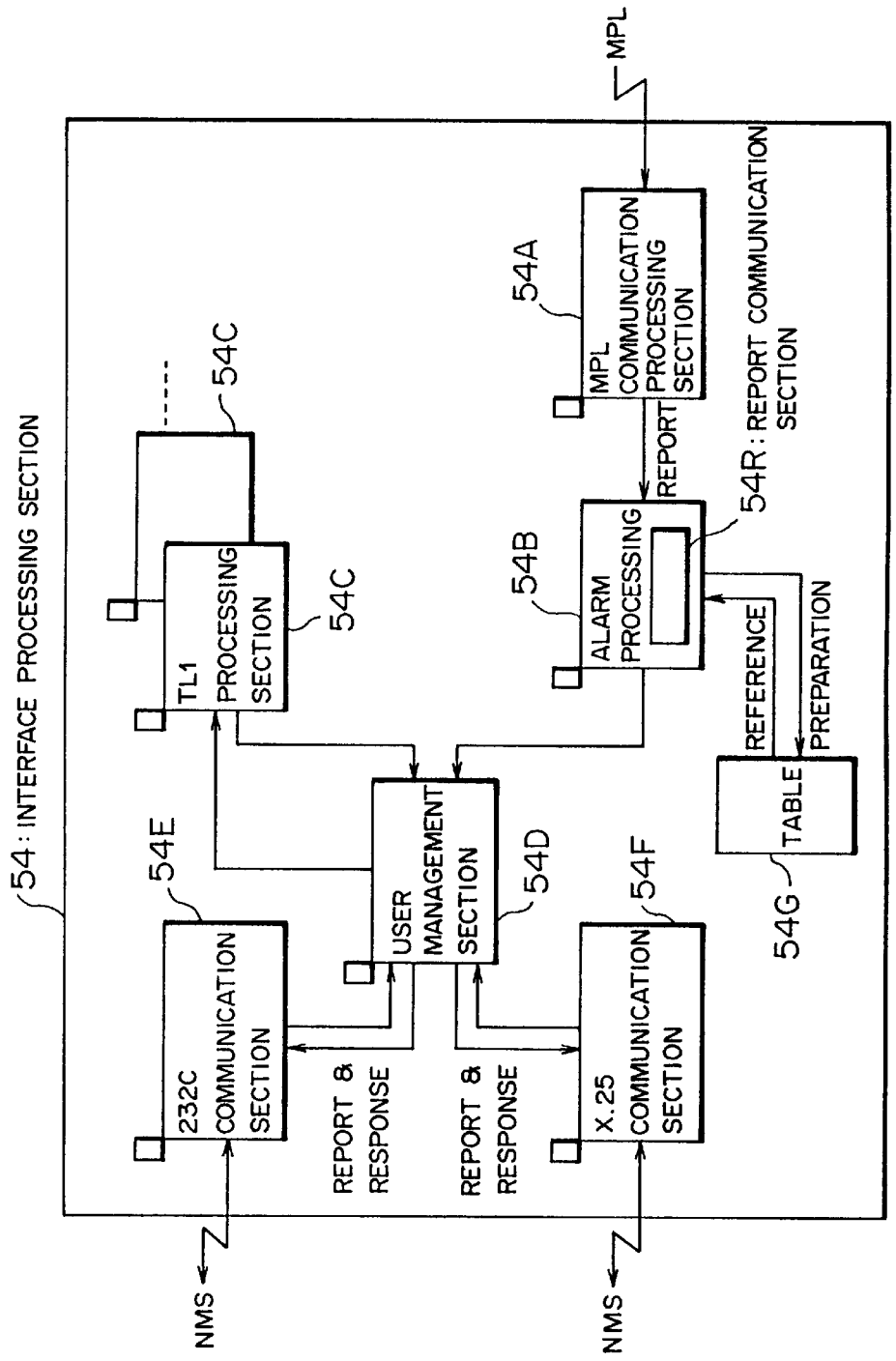
FIG. 25 is a block diagram showing the configuration of an interface processing section in the transmission apparatus.
Figure 28:
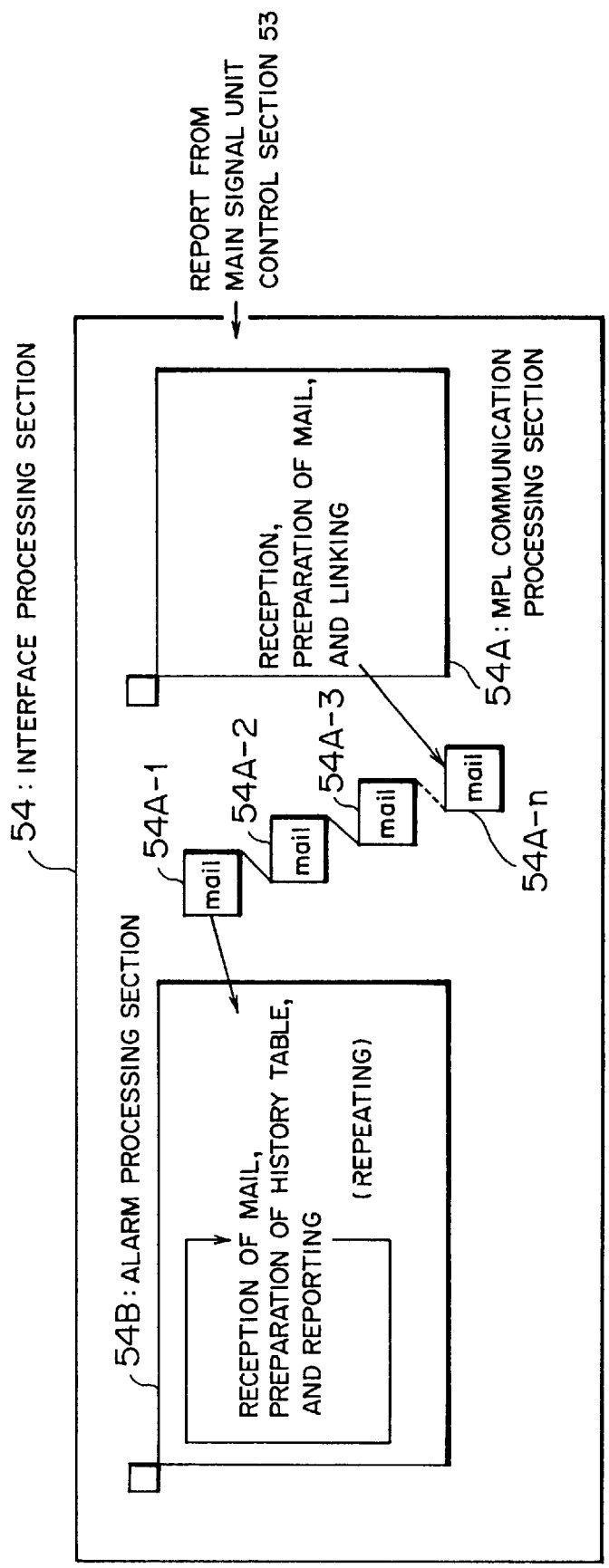
FIG. 28 is a schematic representation for explaining the operation of the interface processing section.

FIG. 3 is a block diagram showing the configuration of an interface processing section which acts as a fault information management apparatus according to one embodiment of the present invention. An interface processing section 1 shown in FIG. 3 corresponds to the interface processing section 54 of the transmission apparatus 51-i shown in FIG. 22. As shown in FIG. 3, the interface processing section 1 is provided with a fault history preparation section 2 and a report communication section 3 independently of each other. Further, the interface processing section 1 is provided with an MPL communication processing section 54A, a TL1 processing section 54C, a user management section 54D, 232C communication sections 54E, and an X.25 communication section 54F, all being identical with those previously described with reference to FIG. 25.

Figure 4:
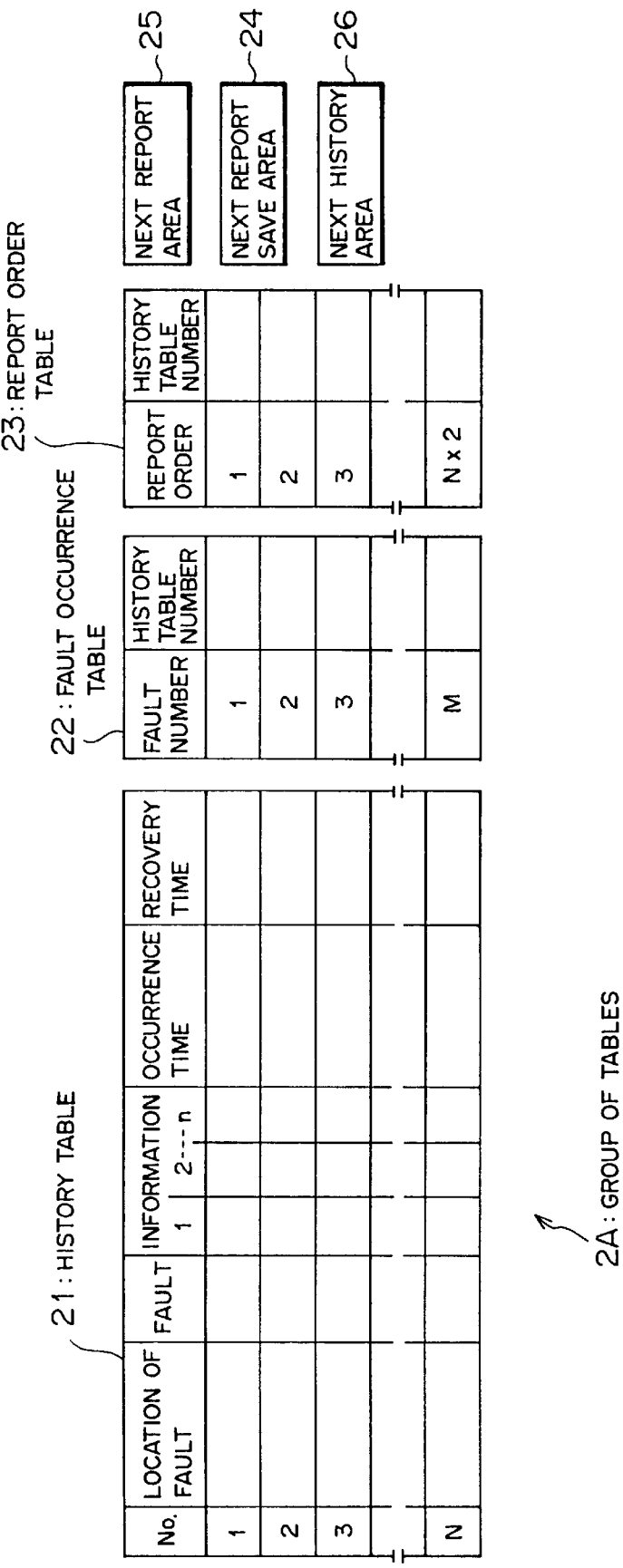
FIG. 4 is a schematic representation showing the configuration of a group of tables used in the embodiment of the present invention.

Upon receipt of information related to faults occurred in the main signal unit 52 (i.e., the occurrence/correction of faults) through a main signal unit control section 53, the fault history preparation section 2 prepares a fault history for a monitoring apparatus 50 The fault history preparation section 2 is comprised of a group of tables 2A and an alarm processing section 2B. As shown in FIG. 4, for example, the group of tables 2A further comprises a history table 21, a fault occurrence table 22, a report order table 23, a NEXT report save area 24, a NEXT report area 25, and a NEXT history area (NEXT HISTORY) 26.

The history table 21 retains, in the form of a pair, fault occurrence information (e.g., the time at which a fault has arisen and the place of the fault) received when such a fault as previously described arises in the transmission element 51-i, and fault recovery information (e.g., the time at which the fault has been corrected) received when the fault has been corrected. The history table 21 is designed so as to hold, in the order of occurrence of faults, the place of a fault, the fault (the name of the fault), information (information about the fault), the time at which the fault has arisen, and the time at which the fault has been corrected. More specifically, the area for holding information about whether or not the monitoring apparatus 50 has been informed of the occurrence of a fault/correction of the fault managed by the history table 54G shown in FIG. 26, is deleted from the history table 21 of the present embodiment.

The log capacity (N) of the history table 21 is set by the monitoring apparatus 50, as required. For example, if 10,000 logs are necessary, N=10,000 will be previously set. If the log capacity (N) has been filled, the logs may be deleted in chronological order, or new logs may be sequentially written from the beginning after all of the old logs have been deleted.

Figure 5:
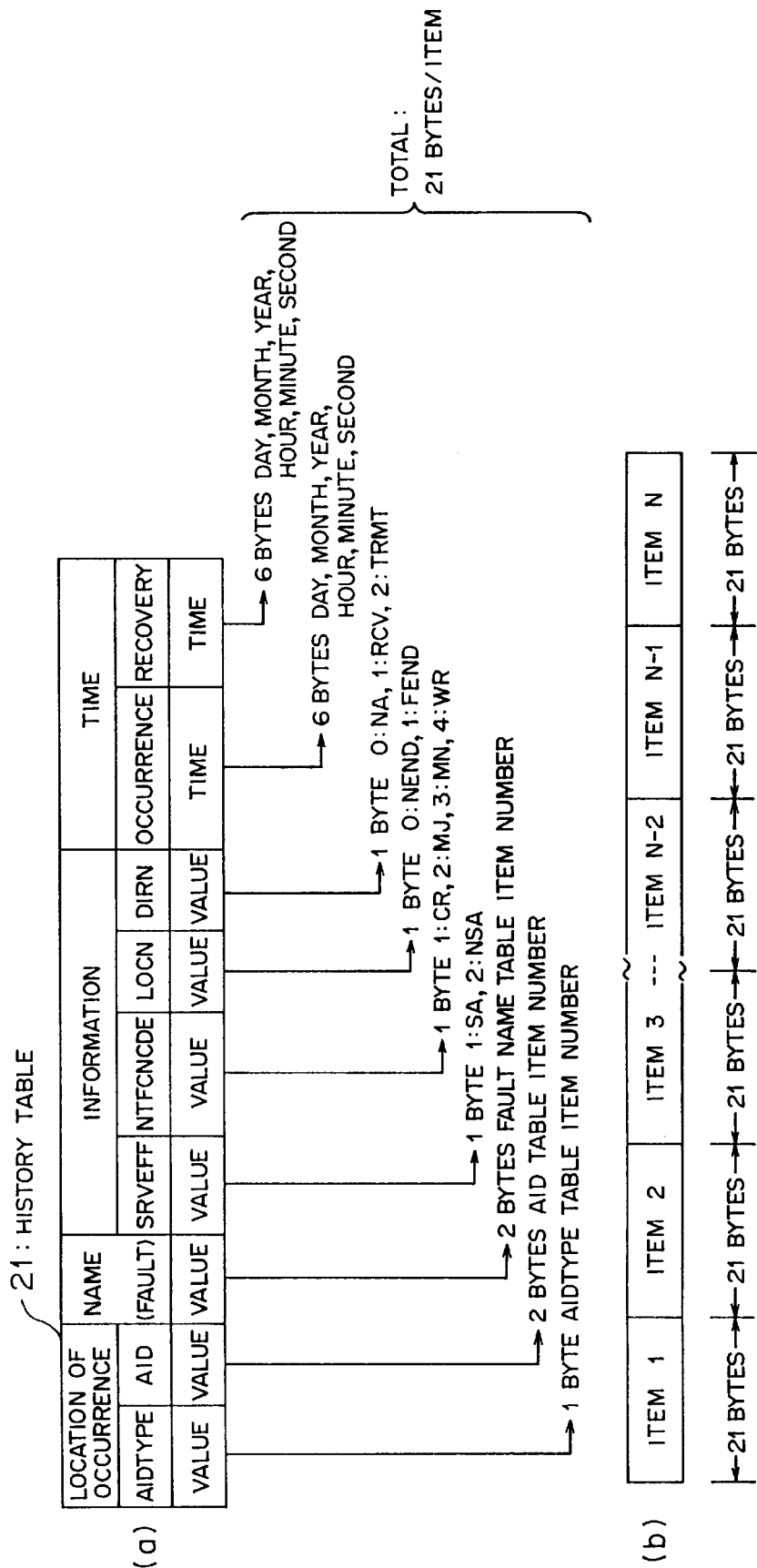
FIGS. 5(a) and 5(b) are schematic representations showing the configuration of history tables according to the embodiment of the present invention.

The "Location of Fault" designates the place of a fault occurred in the transmission apparatus 51-i (i.e., the place at which the fault has occurred). Names of the places where the faults have arisen are written into this column after having been converted into numerical values. More specifically, two types of numerical values; namely, an AIDTYPE value (one byte) and an AID value (two bytes), are written into the "Location of Fault (the place where a fault has arisen)", as shown in FIG. 5(a). The AIDTYPE value corresponds to, e.g., an item number placed at the head of an AIDTYPE table 27 shown in FIG. 6. The AID value corresponds to, e.g., item numbers placed at the head of AID tables 28–31 as shown in FIGS. 7(a), 7(b), 8(a), and 8(b).

Figure 6:
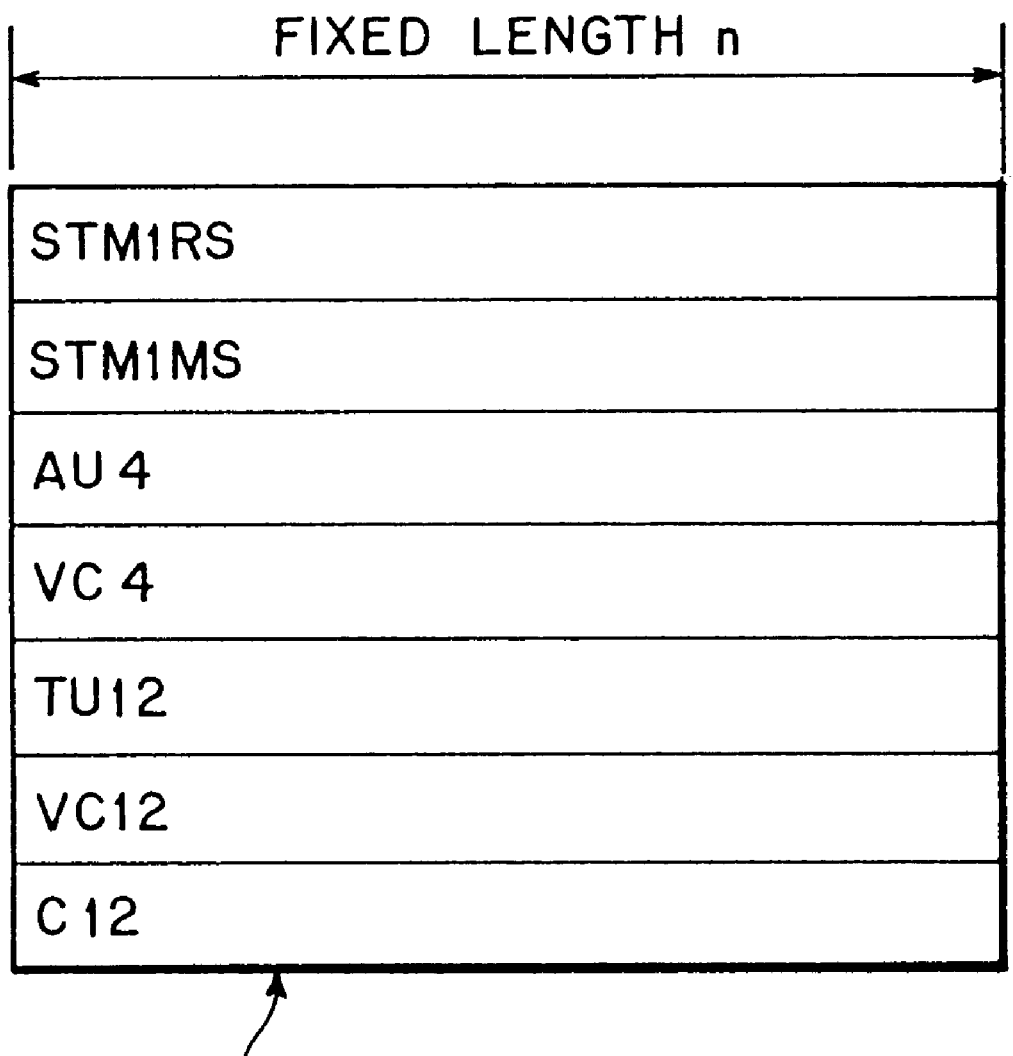
FIG. 6 is a schematic representation showing the configuration of an AIDTYPE table according to the embodiment of the present invention.

The AIDTYPE table 27 roughly classifies faults occurred. As shown in FIG. 6, character strings, such as STM1RS (at the time of RSOH termination process), STM1MS (at the time of MSOH termination process), AU4, VC4, TU12, VC12, and C12, are registered in fixed-length n areas so as to permit specification of the place of a fault in each signal processing level. Numbers (or item numbers) assigned to these areas are written into the history table 21 as AIDTYPE values. "Null" is written into an unregistered area of the AIDTYPE table 27.

In this AIDTYPE table 27, a leading pointer is calculated from the position of a registered number Xn written in the history table 21. The thus-obtained leading pointer is used in sending a report to the monitoring apparatus 50 or in reading data.

Figure 7A:
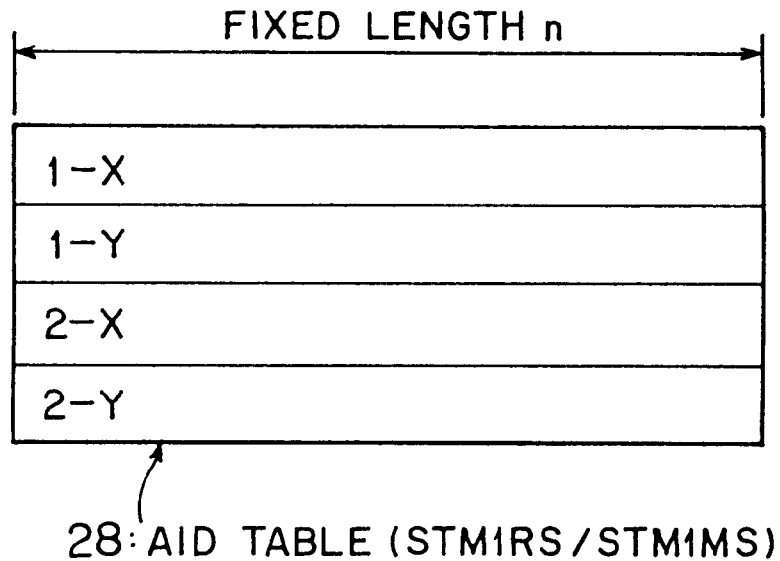
FIGS. 7(a) and 7(b) are schematic representations showing the configuration of an AID table according to the embodiment of the present invention.

The AID tables 28–31 contain items obtained by further classifying the items provided in the AIDTYPE table 27 (i.e., the position where a fault has occurred) in a more detailed manner. For example, the AID table 28 is classified according to the name of a device (slot) in order to indicate which of the optical units 52A has been subjected to occurrence of a fault at the STM1 level, as shown in FIG. 7(a). If the numerical value written into the history table 21 as the AIDTYPE value is a numerical value corresponding to STM1RS or STM1MS; namely, if a fault has arisen in STM1RS or STM1MS, the item number corresponding to the device name on the AID table 28 (any one of 1-X, 1-Y, 2-X, and 2-Y) which represents the optical unit 52A having the fault at the STM1 level arisen therein, is written into the history table 21 as an AID value.

The items (or device names) shown in FIG. 7(a) are directed to the case where the optical units 52A are fitted to the free spaces 52b (i.e., uncouples), as previously described with reference to FIG. 23. A total of four STM1 slots correspond to the above-described 1-X, 1-Y, 2-X, and 2-Y in order from left.

Figure 7B:
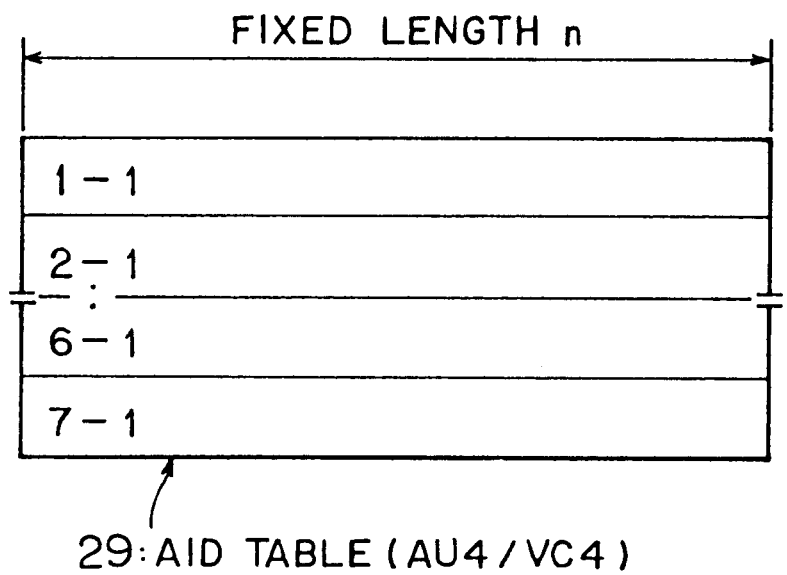

The AID table 29 is a table for indicating which of the slots has been subjected to occurrence of a fault at the AU4 level or VC4 level. For example, the table is itemized according to the name of a slot, as shown in FIG. 7(b). If the numerical value written into the history table 21 as the AIDTYPE value is a numerical value corresponding to AU4 or VC4; namely, if a fault has arisen in the AU4 level or VC4 level, an item number corresponding to a slot name (in this embodiment, one of seven patterns 1-1 to 7-1) on the AID table 29 is written into the history table 21 as the AID value.

Figure 23:
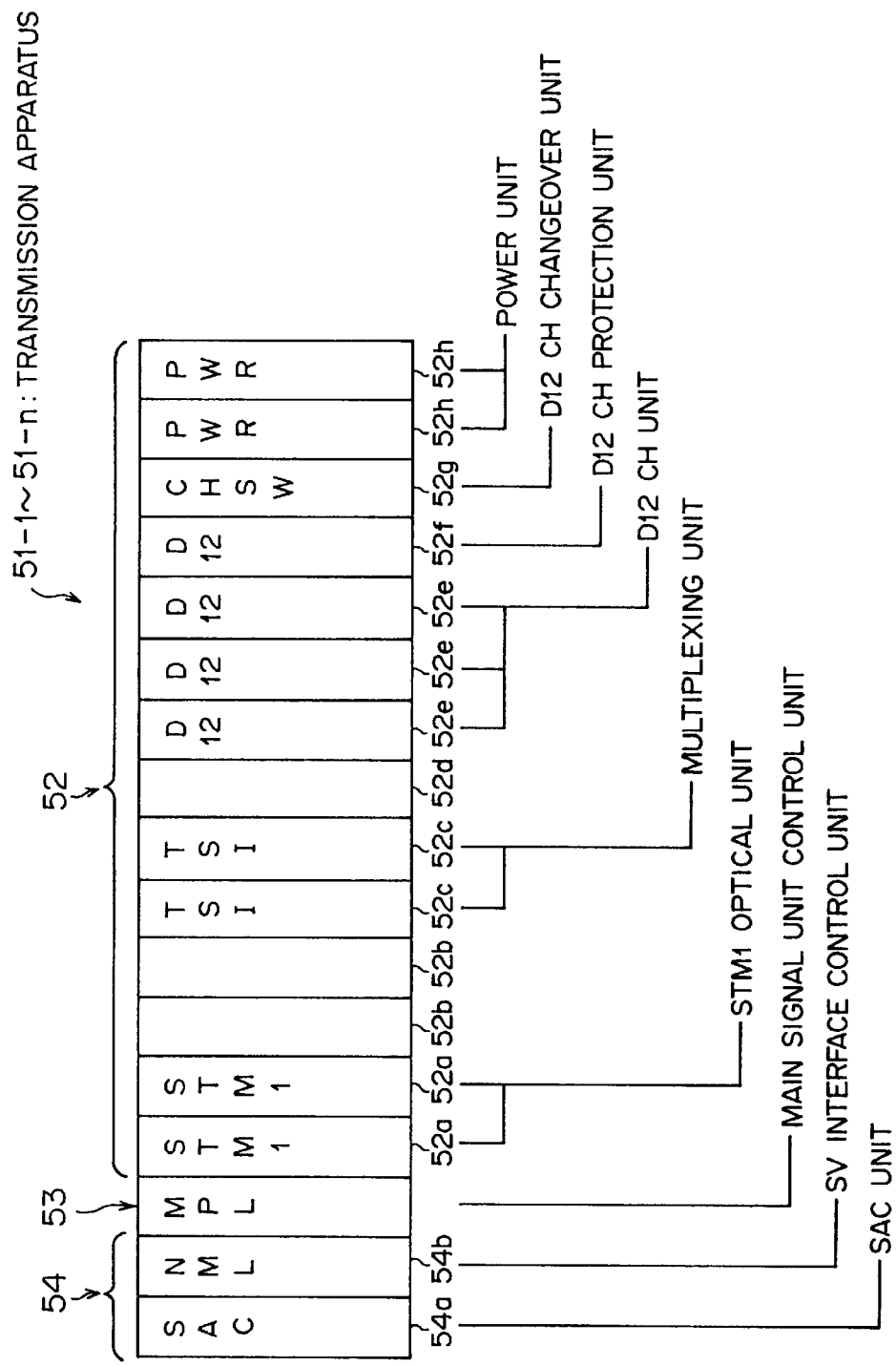
FIG. 23 is a block diagram for showing a detailed configuration of the transmission apparatus.
Figure 24:
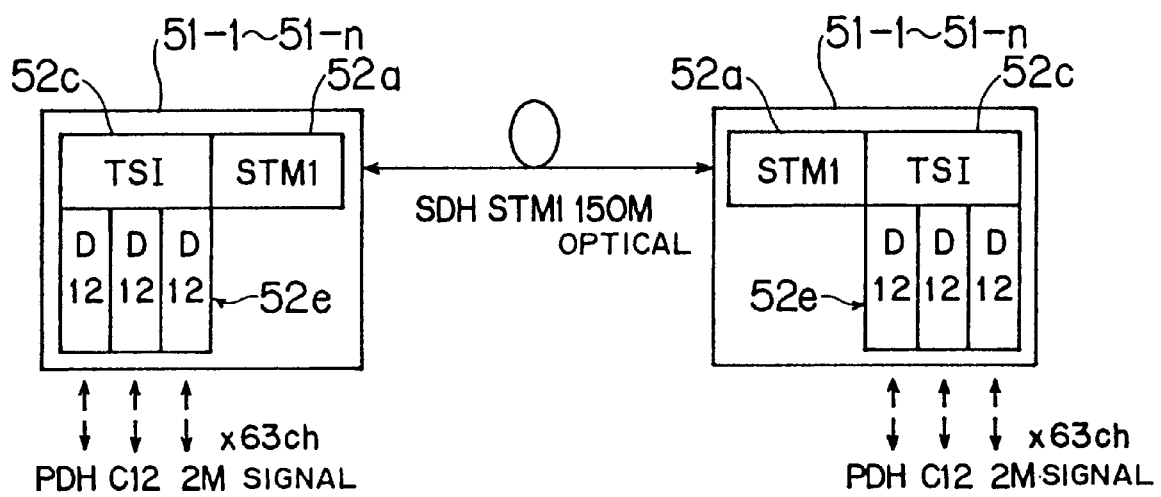
FIG. 24 is a diagrammatic representation for explaining a method for optical transmission between the transmission apparatuses.

The numerical value ("1"–"7") on the left side in each row of the AID table 29 shown in FIG. 7(b) designate the positions of the slots in the main signal unit 52 shown in FIG. 23. For example, "1," "2," and "3" correspond to slots 52a, 52b, and 52d shown in FIG. 23. Further, "4" to "7" correspond to a total of four slots 52e and 52f shown in FIG. 23.

In contrast, the numerical value ("1") provided on the right side in each row of the AID table 29 shown in FIG. 7(b) designates the number of AU4. The STM1 frame consists of one AU4, and therefore all of the corresponding areas are filled with "one." In the case of an STM4 frame, four AU4 are mapped. Therefore, the numerical value on the right side in each row is set to any one of "1" to "4."

Figure 8A:
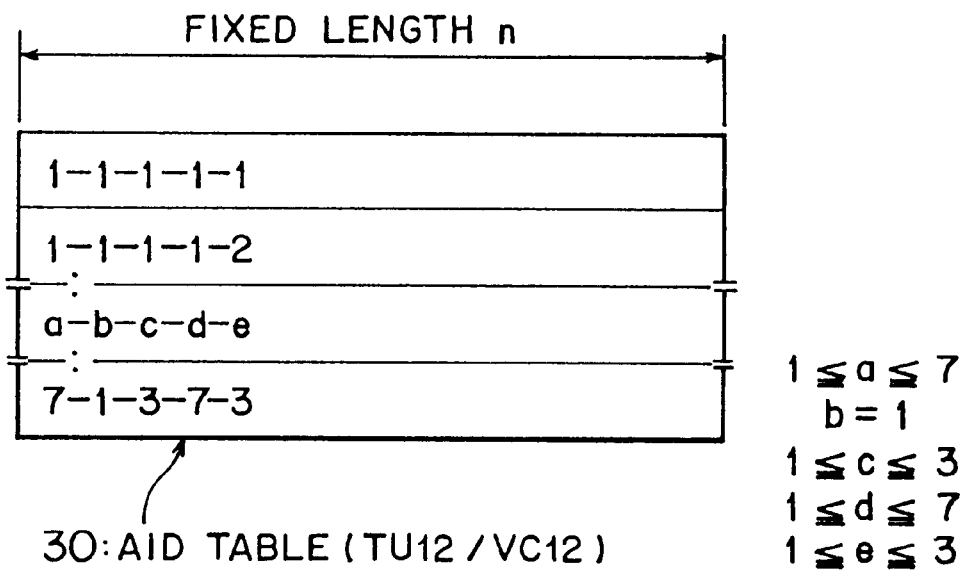
FIGS. 8(a) and 8(b) are schematic representations showing the configuration of the AID table according to the embodiment of the present invention.

The AID table 30 is a table for indicating which of the slots has been subjected to occurrence of a fault at the TU12 or VC12 level and which of signal levels has been subjected to such a fault, during the course of disassembly of the VC4 signal up to the C12 signals which are the smallest unit. For example, the table is itemized as shown in FIG. 8(a).

If the numerical value written into the history table 21 as an AIDTYPE value is a numerical value corresponding to TU12 or VC12; namely, if a fault has arisen in the TU12 or VC12 level, an item number on the AID table 30 corresponding to the slot in which the fault has arisen and a signal level [any one of 441 possible patterns from 1-1-1-1-1 to 7-1-3-7-3 (a-b-c-d-e: $1 \leq a < 7$, b=1, $1 \leq c \leq 3$, $1 \leq d \leq 7$, $1 \leq e \leq 3$)] is written into the history table 21 as an AID value.

The number of patterns (441 patterns) corresponds to the number of combinations of the maximum number of C12 into which the STM1 frame is disassembled, and the number of slots 52a, 52b, 52e, and 52f.

More specifically, of the quintuple-digit numerals (a, b, c, d, and e), "a" designates a slot number; "b" designates the number of AU4 frames contained in the STM1 frame; "c" designates the number of TUG3 frames contained in the AU4 frame; "d" designates the number of TUG2 frames contained in the TUG3 frame; and "e" designates the number of TU12 frames.

The AID table 31 is a table for indicating which of the slots has been subjected to a fault at the C12 level and which of the channels has subjected to occurrence of the fault. For example, this table is itemized by combination of the slot numbers and the channel numbers, as shown in FIG. 8(b).

If the numerical value written into the history table 21 as the AIDTYPE value is a numerical value corresponding to C12; namely, if a fault has arisen in the C12 level, an item number corresponding to the slot in which the fault has arisen and the channel number on the AID table 31 [any one of 63 patterns from 4-1 to 6-21 (a-b: $4 \leq a \leq 6$, $1 \leq b \leq 21$)] is written into the history table 21 as the AID value.

Figure 8B:
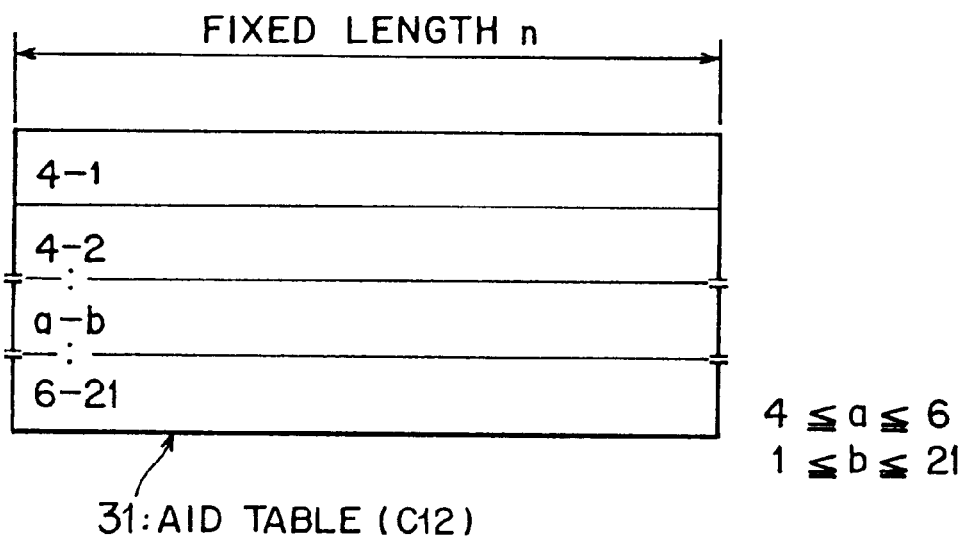

A numerical value ("4" to "6") on the left side in each row in the AID table 31 shown in FIG. 8(b) represents a slot number "4" to "6" of the D12 slot 52e shown in FIG. 23. In contrast, a numerical value ("1" to "21") on the right side in each row designates a channel number.

"FAULT" in the history table 21 shown in FIG. 4 represent details of the faults. For example, a number (i.e., two bytes of an item number) corresponding to an alarm is written in the area "FAULT" on the basis of the fault name table 32 in which the character strings of various alarms (e.g., "LOS," "LOF," "E-ERR," "AIS," "LOP," . . . , "E-SD," or the like) previously described in the item (A) are registered.

"INFORMATION" on the history table 21 designates the features of the details of the fault. For example, information such as "SRVEFF," "NTFCNCDE," "LOCN," and "DIRN" is written into the "INFORMATION" area, as shown in FIG. 5(a).

"SRVEFF" designates information (of one byte) which represents a degree of influence of an alarm (i.e., a fault) on the service. Two types of information; namely, "SA (service is affected by the fault)," and "NSA (service is not affected by the fault)" are written into the "SRVEFF" after having been converted into a predetermined numerical value (e.g., SA=1, or NSA=2). The information is reported to the monitoring apparatus 50 in the form of "SA" and "NSA."

The "NTFCNCDE" is information (1 byte) which represents a degree of emergency of an alarm. Four types of information; e.g., CR (Critical Alarm), MJ (Major Alarm), MN (Minor Alarm), and WR (Warning), are written into "NTFCNCDE" after having been converted into predetermined numerical values (e.g., CR=1, MJ=2, MN=3, and WR=4). If the alarm condition is removed, a value representing CL (Clear Alarm) will be written into the "NTFCNCDE." The above-described information is reported to and displayed on the monitoring apparatus 50 in the form of "CR," "MJ," "MN," "WR," and "CL."

The "LOCN" is (one byte of) information which represents a device in which the corresponding alarm has arisen. The information has two types; namely, "NEND (a sending-side transmission apparatus)" and "FEND (the opposite-side transmission apparatus)". These information pieces are written into the "LOCN" after having been converted into predetermined numerical values (e.g., NEND=0, FEND=1). The information is reported to and displayed on the monitoring apparatus 50 in the form of "NEND" and "FEND."

The "DIRN" is (one byte of) information which represents an attribute regarding the direction (transmitting direction or receiving direction) of the corresponding alarm item. The information has three types; namely, "TRMT (the transmitting direction)", "RCV (the receiving direction)", and "NA (not depending on the direction)". These information pieces are displayed on the "DIRN" after having been converted into predetermined numerical values (e.g., TRNT=2, RCV=1, NA=0). The information is reported to and displayed on the monitoring apparatus 50 in the form of "TRMT," "RCV," and "NA."

"The time at which a fault has occurred" and "the time at which the fault has been corrected" are written into "TIME" on the history table 21 in the form of six bytes of numerical values representing a date (day, month, year) and a time (hour, minute, second).

More specifically, the above-described history table 21 is formed into a configuration as shown in FIG. 4 as a result of sequential expansion of the above-described various information (comprising a total of 21 bytes) on memory (not shown) in the manner as shown in FIG. 5(b).

The information on the history table 21 is automatically supplied to the monitoring apparatus 50 in the form of a report format; e.g., <ALMCDE><ATAG> REPT ALM <AIDTYPE> cr If "<AID> :<NIFCNCDE>, <CONDTYPE>, <SRVEFF>, , , <LOCN>, <DIRN>: ¥"<CONDDESCR>¥"" cr If, every time an alarm is issued.

<ALMCDE> in the report format represents a degree of emergency of the corresponding alarm as does "NTFCNCDE" of "INFORMATION" on the above-described history table 21. In this report format, "CR," "MJ," "MN," "WR," and "CL" which represent a degree of emergency are reported to the monitoring apparatus 50 in the form of; e.g., "*C," "**," "*^," "*W," and "A^."

<ATAG> represents the order in which the information is reported. The <ATAG> is represented by a sextuple-digit numerical value. <CONDTYPE> represents the name of the corresponding alarm. The name of the alarm is represented by an abbreviation consisting of a maximum of 15 letters.

For example, if the report format reads "*C 000001 REPT ALM STM1RS "1-X:CR,LOS,SA , , , NEND,RCV:¥LOS OF SIGNALS¥"" this reports shows that the alarm is first issued (000001). Further, it is indicated that the entry of an optical signal is interrupted (LOS) in a receiving direction (RCV) of the sending-side transmission apparatus (NEND) when RSOH of the STM1 frame in the STM1 slot 52a of the left-end (1-X) shown in FIG. 23 is terminated. Moreover, it is indicated that the alarm (LOS) affects the service (SA) and has the highest degree of emergency (CR).

In addition to the above-described automatic report to the monitoring apparatus 50, the details of all of the logs provided in the history table 21 are also reported to the monitoring apparatus 50 in the form of log information (LOG) in response to receipt of a demand for the history from the monitoring apparatus 50.

For example, if the transmission apparatus 51-i has received from the monitoring apparatus 50 data having a format "RTRV-ALM-ALL<TID>::<CTAG>::,,,, ;"<AID>:<NTFCNCDE>, <CONDTYPE>, <SRVEFF>,, <LOCN>,<DIRN>: ¥<CONDDESCR>¥""cr If" as a history request (command) for the transmission apparatus 51-i, the transmission apparatus 51-i returns various information pieces on the history table 21 to the monitoring apparatus 50 in a format such as "<AID>:<AIDTYPE>,<NTFCNCDE>, <CONDTYPE>,<SRVEFF>, , ,<LOCN>,<DIRN>:¥<CONDDESCR>¥""crIf."

As shown in FIG. 4, the fault occurrence table 22 holds positions on the history table 21 when fault occurrence information is registered. The fault occurrence table 22 has the capacity (here M=number of types of faults x the number of channels) corresponding to all the possible faults which will arise in the transmission apparatus 51-i. The fault occurrence table 22 holds a numerical value (i.e., a "fault number") written in "NAME OF FAULT" and the registration position of the "FAULT NUMBER" on the history table 21 in such a way as to correspond to each other.

If the fault is corrected, a written number (i.e., a history table number) is cleared (or null will be written), as will be described later.

The report order table 23 holds the order in which the fault occurrence report and the fault recovery report have been reported to the monitoring apparatus 50, as the order in which the fault occurrence information and the fault recovery information have been registered in the history table 21. The report order table 23 has a capacity (N) which is twice as large as that of the history table 21 so as to cope with occurrence/recovery of a fault. The positions (history table numbers) of the history table 21 in which the fault information to be reported to the monitoring apparatus 50 (i.e., the fault occurrence information or the fault recovery information) are written in the report order table 23 in the order in which the information has been registered in the history table 21 (i.e., in chronological order of registration), together with the fact about the occurrence/collection of the fault.

The NEXT report save area (the next registration position holding section) 24 holds the position of the registration order table 23 in which the registration order information (i.e., a history table number, and the fact about the occurrence/correction of a fault) to be registered in the report order table 23 next time is registered. The NEXT report area (the final registration position holding section) 25 holds the position of the report order table 23 in which the registration order information has been finally registered in the report order table 23 (i.e., finally reported to the monitoring apparatus 50). The NEXT history area 26 holds the position (i.e., a history table number) at which the fault information to be registered in the history table 21 next time is written.

The alarm processing section (i.e., the fault information processing section) 2B shown in FIG. 3 controls registration (writing) process of the above-described fault information (i.e., the fault occurrence information or the fault recovery information) into the history table 21; registration process of the position of the history table 21 at which the fault occurrence information has been registered, into the fault occurrence table 22; registration process of the order in which the fault information has been registered in the history table 21, into the report order table 23; and registration process of the NEXT report save area 24, the NEXT report area 25, and the NEXT history area 26.

Upon receipt of fault occurrence information from the main signal unit control section 53, the alarm processing section 2B registers the thus-received fault occurrence information in the corresponding area on the history table 21 designated by the history table number stored in the NEXT history area 26. Further, the alarm processing section 2B registers the registration position (i.e., a history table number) into the fault occurrence table 22. In contrast, upon receipt of fault recovery information (e.g., the time at which the fault has been corrected) as a result of correction of the fault, the alarm processing section 2B registers the fault recovery information (or to write the recovery time) in the corresponding area of the history table 21 designated by the registered history table number with reference to the fault occurrence table 22.

The above-described alarm processing section 2B is designed to reset the history table number registered in the fault occurrence table 22 when the fault recovery information has been registered in the corresponding area of the history table 21 in the manner as previously described. As a result, it is possible to allow for the user to reliably ascertain the occurrence and correction of the fault.

Further, the alarm processing section 2B refers to the fault occurrence table 22 when the fault occurrence information is registered in the history table 21, as will be described later. If a history table number related to the identical type of fault occurrence information has already been registered, the alarm processing section 2B will not register such fault occurrence information in the history table 21. More specifically, the information related to a fault identical with the fault which is already in the course of development, is prevented from being written into the history table 21 in a duplicated manner.

At the time when the fault recovery information has been received from the main signal unit control section 53, the alarm processing section 2B registers the fault occurrence information and the fault recovery information in the corresponding areas of the history table 21 if a history table number associated with the fault occurrence information corresponding to the corrected information has not been registered in the fault occurrence table 22.

Further, the alarm processing section 2B registers the history table number and the fact about the occurrence/correction of the fault, as registration order information in an area of the report order table 23 designated by the registration position registered in the NEXT report save area 24. Moreover, the alarm processing section 2B registers the next registration position of the report order table 23 in the NEXT report save area 24. As a result, the position of the history table 21 in which the fault occurrence information or the fault recovery information is written, is written into the report order table 23 in the order in which the information has been registered in the history table 21.

The report communication section 3 shown in FIG. 3 carries out reporting of fault information to the monitoring apparatus 50 independently of preparation of a fault history executed by the fault history preparation section 2, on the basis of the fault log (a group of tables 2A) prepared by the fault history preparation section 2. As will be described later, if the registration position information registered in the NEXT report area 25 is different from the registration position information registered in the NEXT report save area 24, the fault occurrence information or the fault recovery information corresponding to the difference between the registration position information pieces will be fetched from the history table 21. The thus-fetched fault occurrence information or the fault recovery information will be reported to the monitoring apparatus 50. The reporting to the monitoring apparatus 50 is performed by a report alarm in compliance with the above-described report format, or by response in compliance with a response format.

By virtue of the above-described construction, in the interface processing section 1 which acts as the fault information management apparatus according to the embodiment of the present invention, the fault information sent from the main signal unit control section 53 as shown in FIG. 3 is analyzed by the alarm processing section 2B. If the fault information is fault occurrence information, the information will be registered in the corresponding area of the history table 21 of the table 2A. The registration position of the information is registered in the fault occurrence table 22. In contrast, if the fault recovery information is sent as a result of the correction of the fault, the fault occurrence table 22 is referred. The fault recovery information is registered in the corresponding area of the history table 21 designated by the registration position.

Subsequently, the report communication section 3 reports the history information (i.e., the fault occurrence information or the fault recovery information) to the monitoring apparatus 50 on the basis of the report order table 23 in the order in which the information has been registered in the history table 21. The history information is sent to the monitoring apparatus 50 via the user management section 54D. Alarm processing carried out by the alarm processing section 2B will be described in detail hereinbelow.

(B1) Alarm Processing Under Normal States

Figure 10:
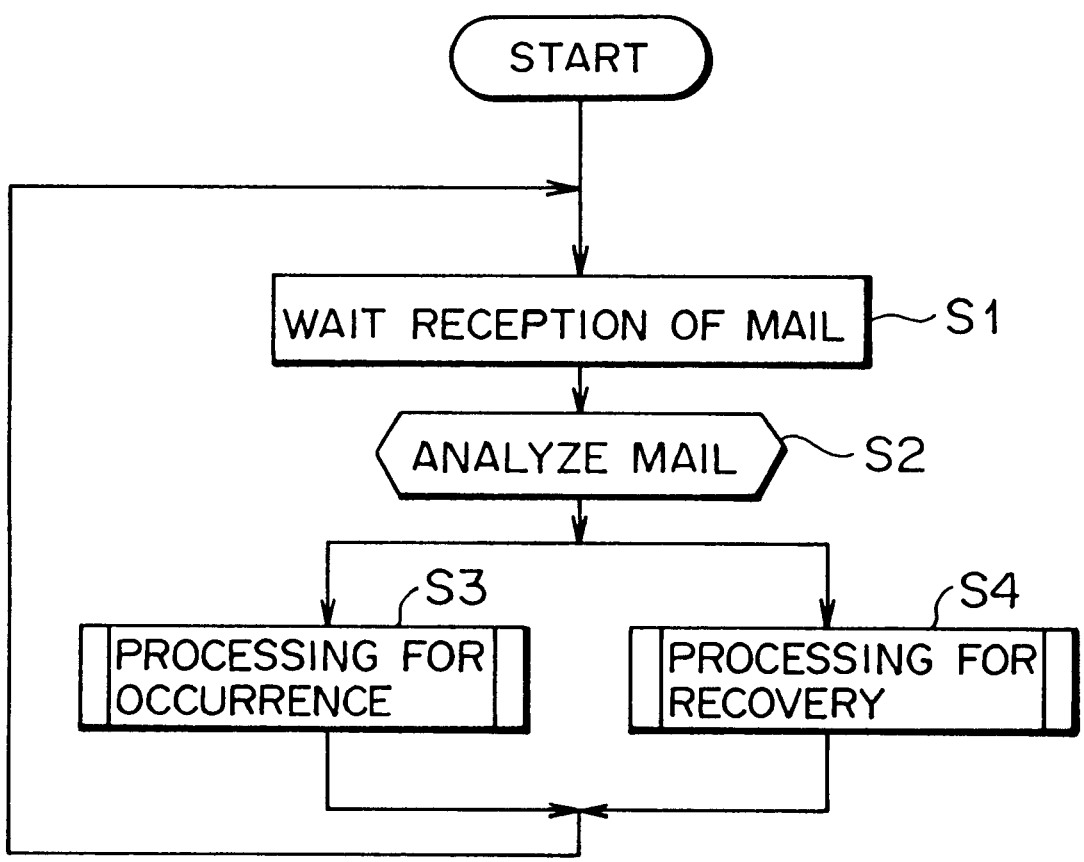
FIG. 10 is a flowchart for explaining the operation of an alarm processing section according to the embodiment of the present invention.

Alarm processing under normal states will be described according to the flowchart (steps S1 to S4) shown in FIG. 10. To being with, upon receipt of fault information (fault occurrence information or fault recovery information) from the main signal unit control section 53 by means of a mail, or the like (WAITING FOR A MAIL: STEP S1), the alarm processing section 2B decides whether the thus-received mail is the fault occurrence information or the fault recovery information (MAIL ANALYSIS: STEP S2).

As a result, if the fault information received from the main signal unit control section 53 is fault occurrence information, the information (i.e., the place of the fault, and the time at which the fault has occurred) is registered in the corresponding area of the history table 21 of the group of tables 2A in the manner as previously described. The registration position (i.e., a history table number) of the history table 21 is registered in the fault occurrence table 22 (STEP S3).

If the fault recovery information is received from the interface control section 53 as a result of correction of the fault, the alarm processing section 2B will refer to the fault occurrence table 22. Then, the fault recovery information, such as the time at which the fault has been corrected, is registered in the area of the history table 21 designated by the history table number without retrieving the history table 21 (STEP S4).

Figure 11:
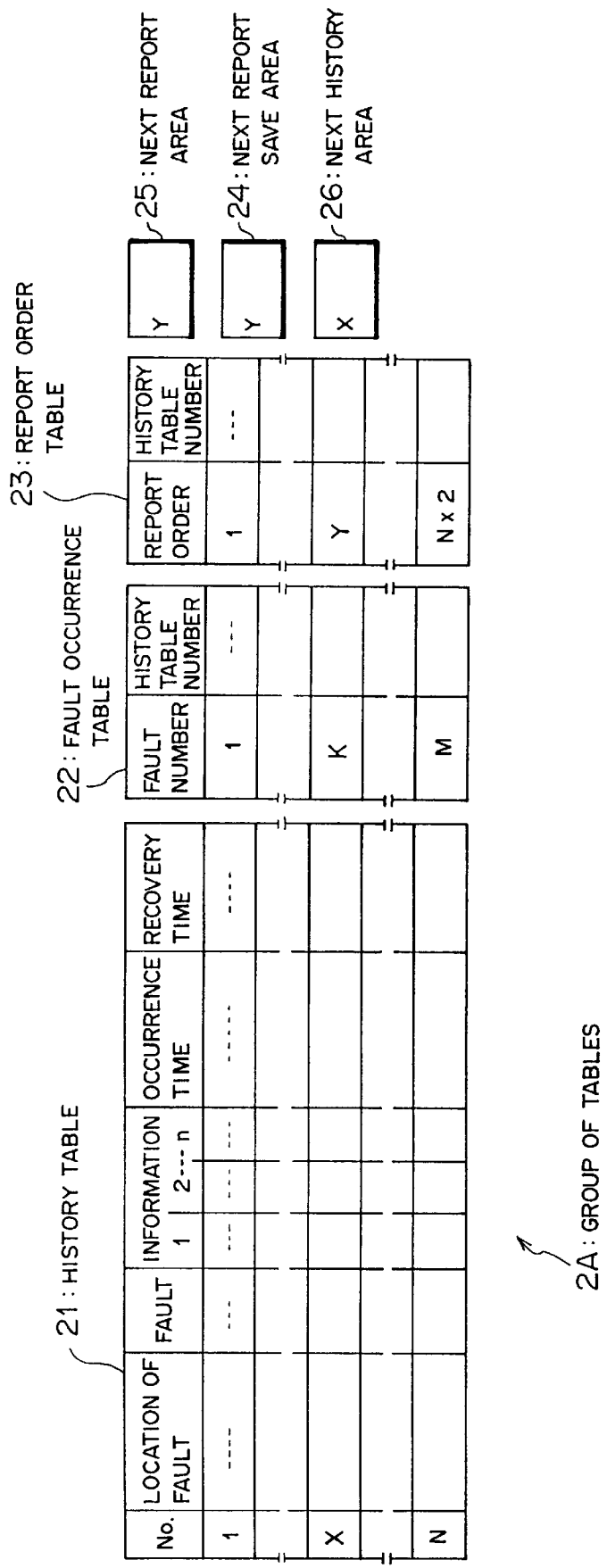
FIG. 11 is a schematic representation showing one example of the contents of a log provided in the group of tables according to the embodiment of the present invention.

Here, it is assumed that the group of tables 2A shown in FIG. 11 are in the following states:

- in the history table 21, next fault information is to be registered in the area X;
- in the fault occurrence table 22, no data is registered in the area corresponding to the fault number K;
- in the report order table 23, next information is to be registered in the area Y;
- in the NEXT report save area 24, Y is registered;
- in the NEXT report area 25, Y is registered; and
- in the NEXT history area 26, X is registered.

It is also assumed that a fault whose number is K (hereinafter referred to as "fault K") has occurred at time T1. The operation of the alarm processing section 2B in the above-described condition will be described with reference to FIGS. 12 and 13.

Figure 12:
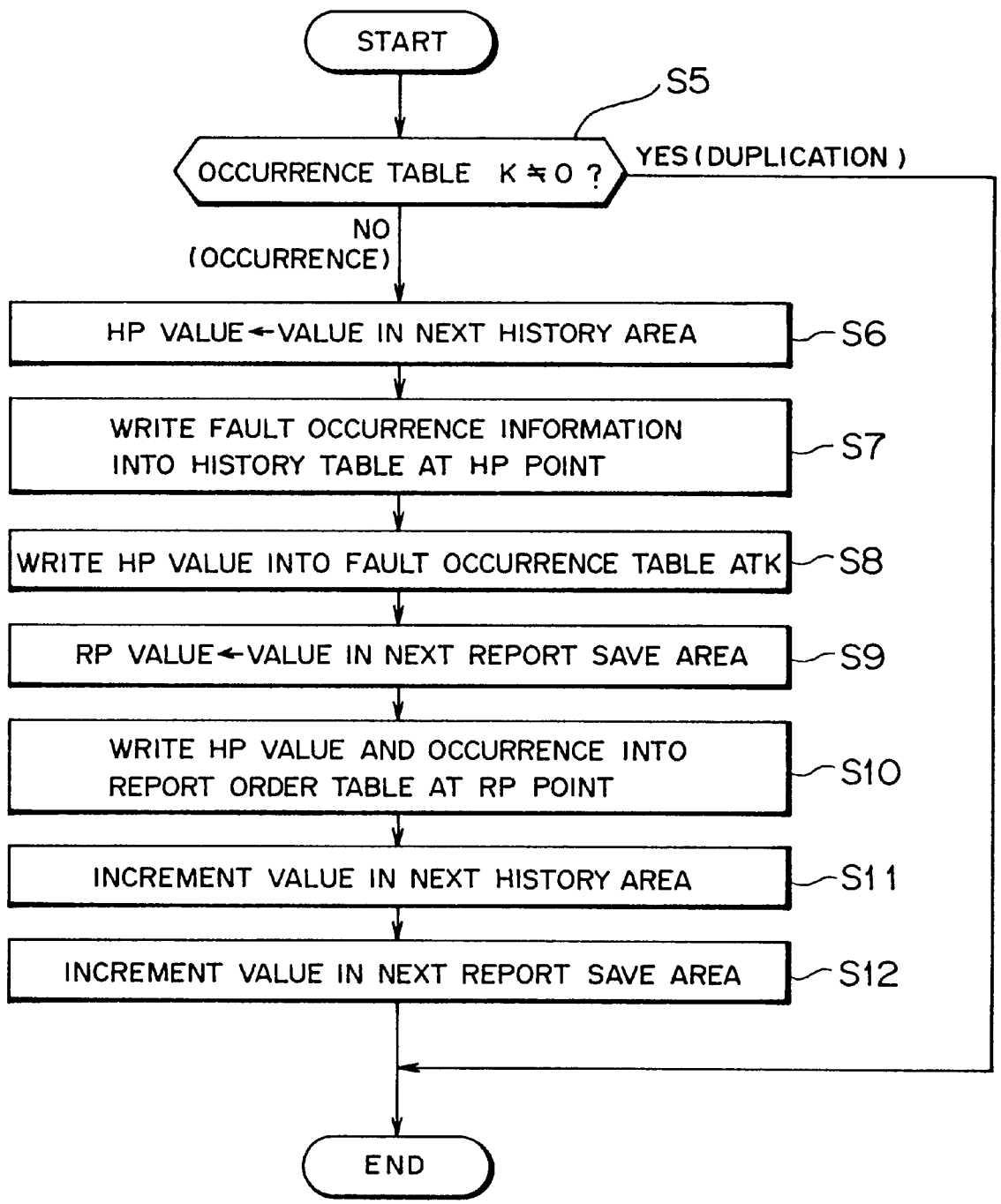
FIG. 12 is a flowchart for explaining the operation of the alarm processing section according to the embodiment of the present invention.

First, upon receipt of the fault occurrence information, the alarm processing section 2B decides whether or not the area of the fault occurrence table 22 corresponding to the fault K (i.e., the history table number) is "null" (STEP S5 in FIG. 12). If the area corresponding to the fault K is "null" (i.e., NO in STEP S5 shown in FIG. 12), an HP value of the history table 21 (the HISTORY POINT VALUE: X), i.e., the history table number, is specified on the basis of the value "X" which is registered in the NEXT history area 26 and represents the registration position of the history table 21 at which information is to be registered next time (STEP S6 in FIG. 12).

Figure 13:
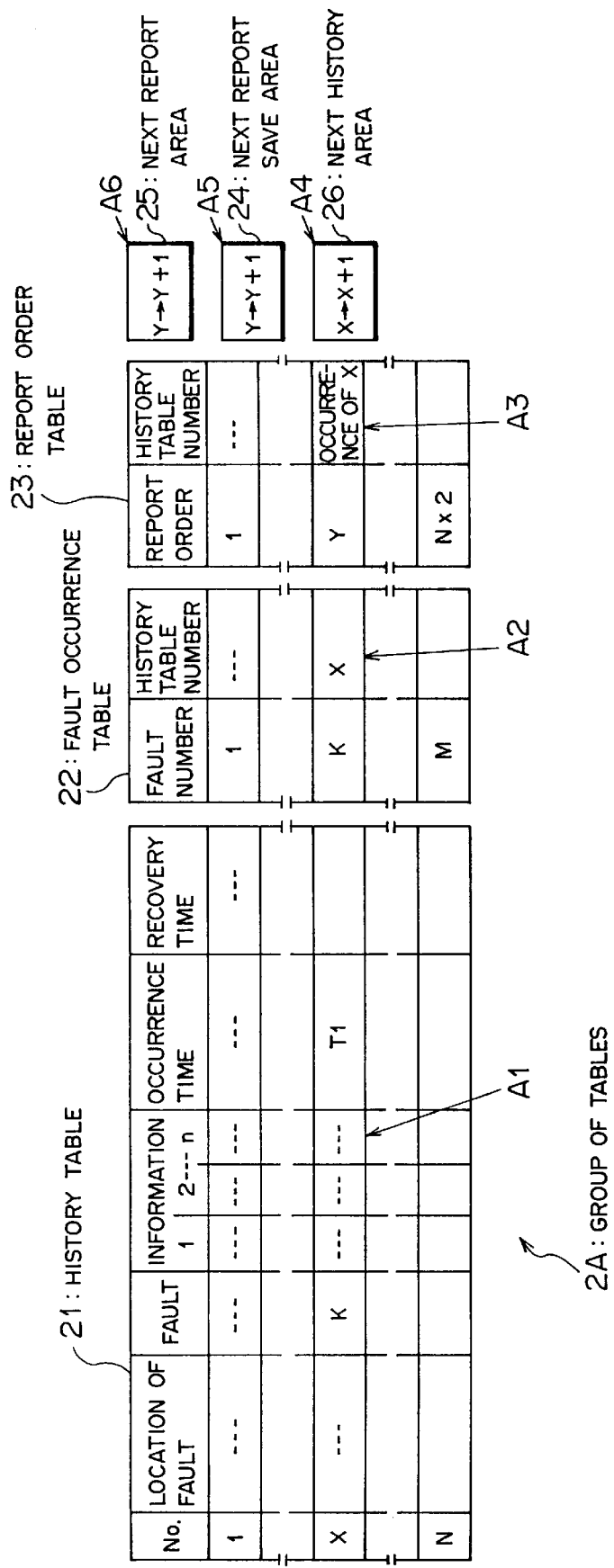
FIG. 13 is a schematic representation for explaining the operation of the alarm processing section according to the embodiment of the present invention.

The fault occurrence information (fault "K," and the time "T1" at which the fault has occurred) is written into the HP area [i.e., the HP point (in the X-th area)] of the history table 21 (STEP S7 shown in FIG. 12 and STEP A1 shown in FIG. 13). Further, the HP value ("X") is written into the area of the fault occurrence table 22 corresponding to the fault K (STEP S8 in FIG. 12, and STEP A2 shown in FIG. 13).

The alarm processing section 2B specifies an RP value (REPORT POINT VALUE: Y) of the report order table 23 on the basis of the value "Y" which is registered in the NEXT report save area 24 and represents the registration position of the report order table 23 at which information is to be registered next time (STEP S9 shown in FIG. 12). As a result, registration order information ("OCCURRENCE OF X") is written into the RP area [the RP point (the Y-th area)] of the report order table 23 (STEP S10 shown in FIG. 12, and step A3 shown in FIG. 13). The value of the NEXT history area 26 which designates the position of the history table 21 at which information is to be written next time is incremented by one ("X+1") (STEP S11 in FIG. 12, and STEP A4 shown in FIG. 13). The value of the NEXT report save area 24 which designates the position of the report order table 23 at which information is to be written next time is incremented by one ("Y+1") (STEP S12 in FIG. 12, and STEP A5 in FIG. 13).

Figure 14:
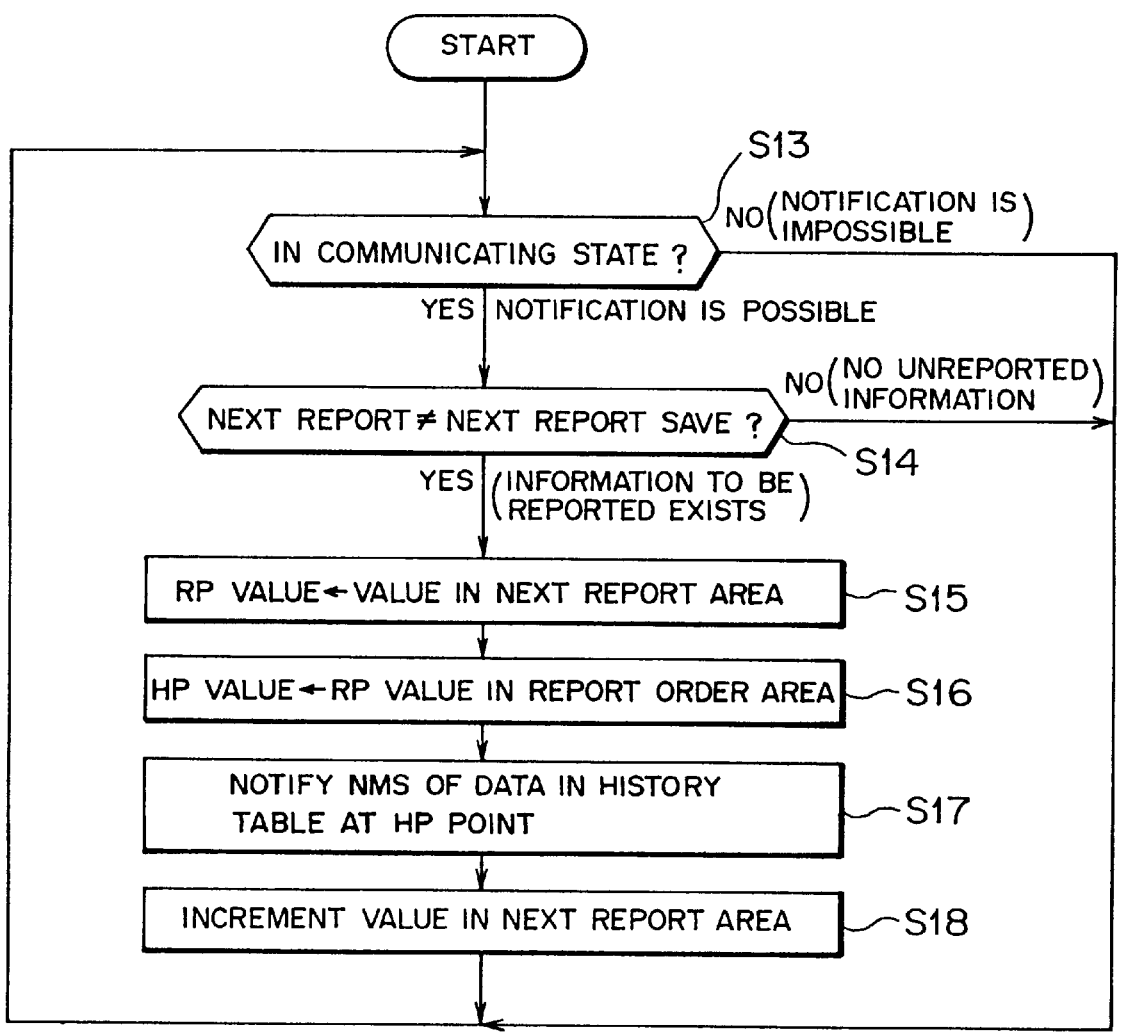
FIG. 14 is a flowchart for explaining the operation of a report communication section according to the embodiment of the present invention.

In contrast, the report communication section 3 decides whether or not communication with the monitoring apparatus 50 can be carried out (STEP S13), as shown in FIG. 14. If the communication with the monitoring apparatus 50 can be carried out (YES in STEP S13), the value retained in the NEXT report save area 24 will be compared to the value registered in the NEXT report area 25 (STEP S14).

At this time, there is the difference between the value ("Y+1") registered in the NEXT report save area 24 and the value ("Y") registered in the NEXT report area 25 (YES in STEP S14). The report communication section 3 specifies an RP value corresponding to the difference on the basis of the registration position registered in the NEXT report area 25 (STEP S15). Then, the report communication section 3 specifies a corresponding HP value on the basis of that RP value (STEP S16).

As a result, a data in the HP area of the history table 21 corresponding to the difference is reported to the monitoring apparatus 50 (STEP S17). Finally, the value of the NEXT report area 25 which designates the position of the report order table 23 in which the data reported to the monitoring apparatus 50 is registered, is incremented by one (STEP S18). In short, the value of the NEXT report area 25 becomes "Y+1," as shown in step A6 shown in FIG. 13.

If the communication with the monitoring apparatus 50 cannot be performed (NO in STEP S13), or if there is no difference between the value registered in the NEXT report save area 24 and the value registered in the NEXT report area 25; namely, if there is no unreported data (NO in STEP S14), the report communication section 3 will not carry out reporting operation.

Processing carried out in the case where the fault K has been corrected, and where the main signal unit control section 53 has received information about the correction of the fault K, will now be described with reference to FIGS. 15 and 16.

Upon receipt of recovery information related to the fault K, the alarm processing section 2B refers to the fault occurrence table 22, as shown in FIG. 1.5. Then, the alarm processing section 2B decides whether or not the area corresponding to the fault K is "null" (STEP S19 shown in FIG. 15). If the corresponding area is not "null" (YES in STEP S19), that value (i.e., the history table number) will be specified as the HP value ("X" in this case) for specifying the position of the history table 21 into which the recovery information is written (STEP S20).

Figure 15:
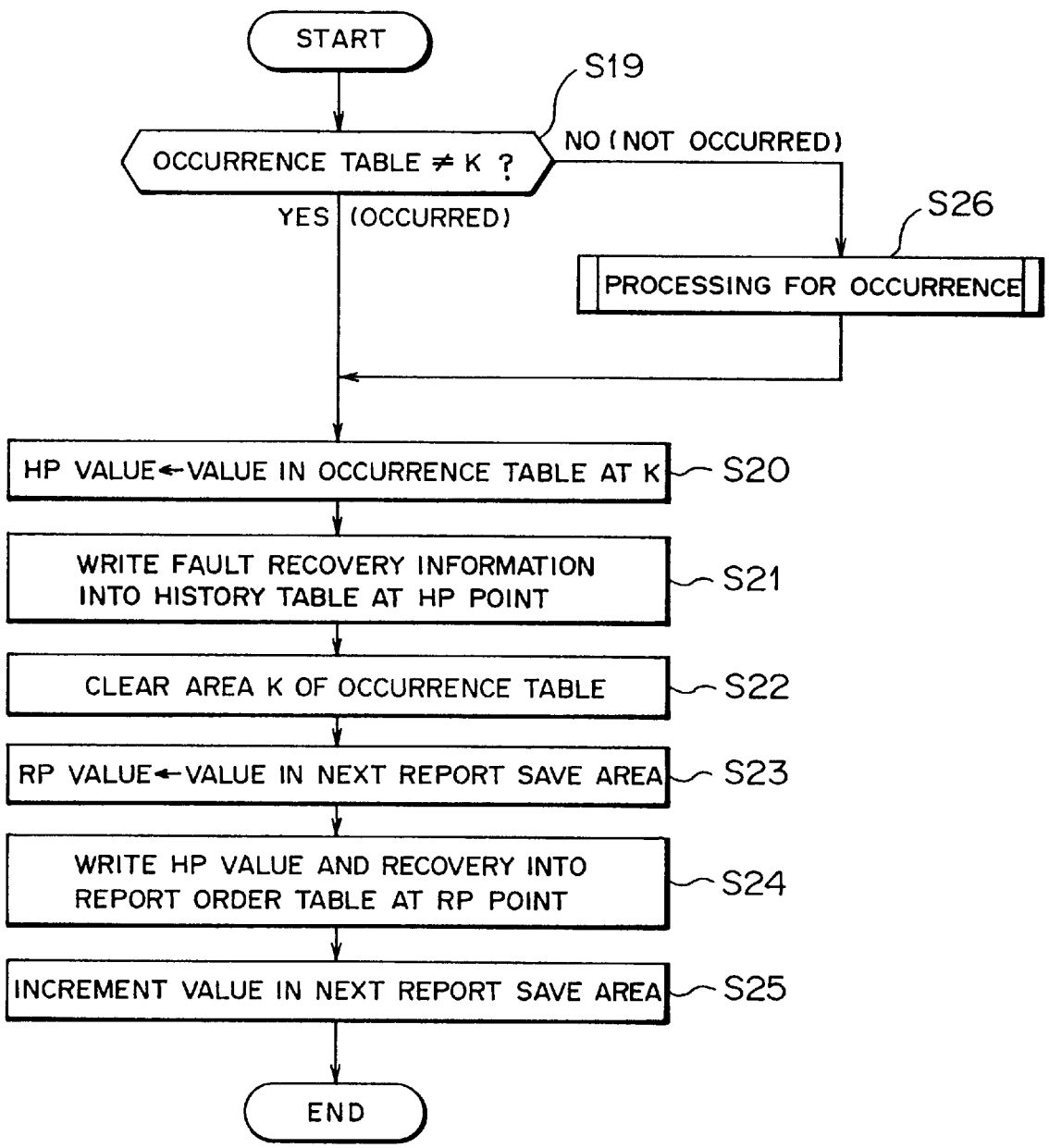
FIG. 15 is a flowchart for explaining the operation of the alarm processing section according to the embodiment of the present invention.
Figure 16:
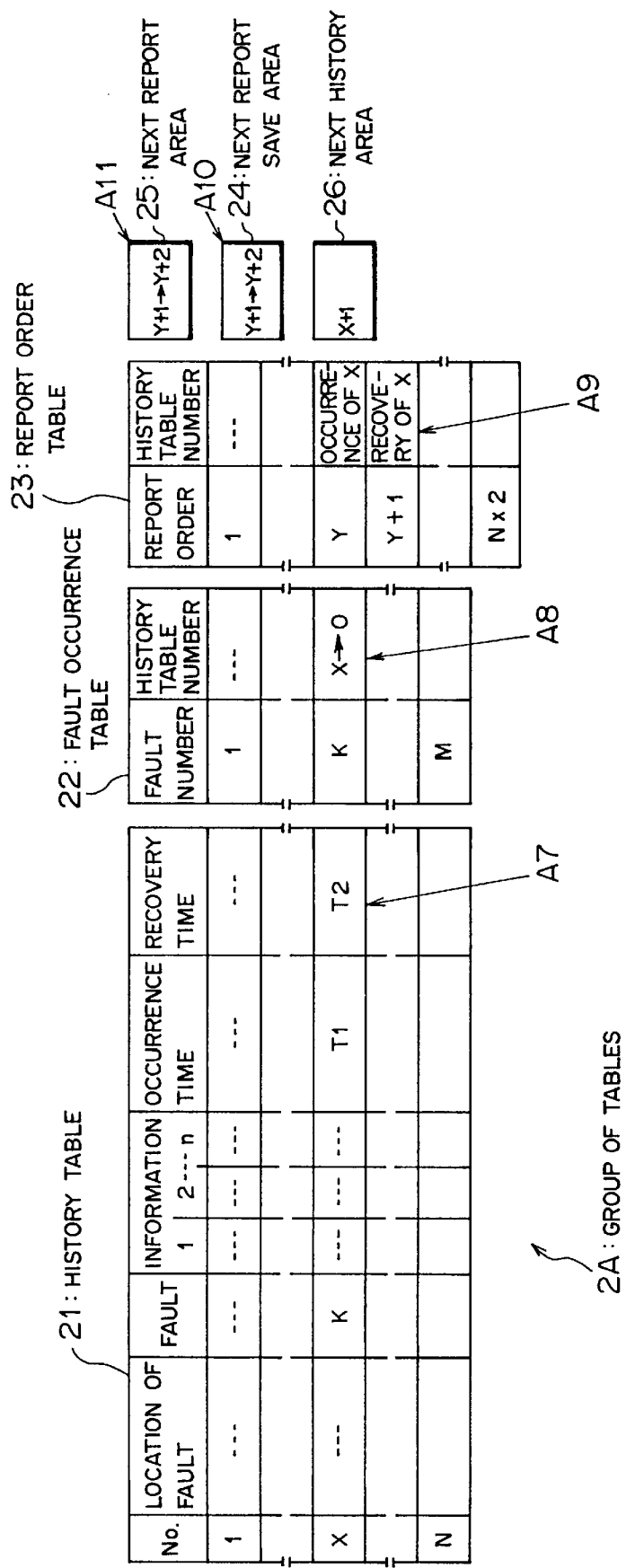
FIG. 16 is a schematic representation for explaining the operation of the alarm processing section according to the embodiment of the present invention.

As a result, the alarm processing section 2B writes the fault recovery information (recovery time "T2") into the corresponding area of the history table 21 designated by the HP value [the HP point (the X-th area)] without retrieving the history table 21 (STEP S21 shown in FIG. 15, and STEP A7 shown in FIG. 16). Then, the HP value ("X") in the area corresponding to the fault K of the fault occurrence table 22 is cleared (to "zero") (STEP S22 shown in FIG. 15, and STEP A8 shown in FIG. 16).

The alarm processing section 2B specifies, as the RP value ("Y+1") of the report order table 23, the value "Y+1" which represents the next registration position of the report order table 23 and is registered in the NEXT report save area 24 (STEP S23 shown in FIG. 15). "CORRECTION OF X" is written into the area specified by the RP value [an RP point (in a Y+1-th area)] (STEP S24 shown in FIG. 15, and STEP A9 shown in FIG. 16). Then, the value of the NEXT report save area 24 is incremented by one ("Y+2") (STEP S25 shown in FIG. 15, and STEP A10 shown in FIG. 16).

Even in this case, the report communication section 3 carries out the above-described reporting operations for the monitoring apparatus 50 (see STEPS S13 to S18 shown in FIG. 14). When there is a difference between the NEXT report save area 24 and the NEXT report area 25, an unreported data corresponding to the difference is reported to the monitoring apparatus 50. Then, the value of the NEXT report area 25 is incremented by one ("Y+2") (STEP A11 shown in FIG. 16).

As described above, according to the interface processing section 1 which acts as the above-described fault information management apparatus, a fault history (the history table 21) for the monitoring apparatus 50 is prepared by means of the alarm 2B when the fault information is received. Report information (i.e., the report order table 23) required to report the fault information to the monitoring apparatus 50 is prepared independently of the fault history. The report communication section 3 can carry out the reporting of the fault information to the monitoring apparatus 50 on the basis of the report information, independently of the preparation of the fault history. Therefore, each of the operations can be quickly and correctly carried out. In consequence, it is possible to report all of the information received from the main signal unit control section 53 to the monitoring apparatus 50, thereby making it possible to improve the processing capability of the transmission apparatus.

In the above-described interface processing section 1, when the alarm processing section 2B receives fault occurrence information, the alarm processing section 2B registers the fault occurrence information in the corresponding area of the history table 21. Further, the registration position (i.e., the history table number) is registered in the fault occurrence table 22. When fault recovery information is received as a result of correction of the fault, the fault occurrence table 22 is referred. The fault recovery information is registered in the corresponding area of the history table 21 designated by the history table number. As a result, the position of the history table 21 to which the fault occurrence information is written is uniquely determined when the fault is corrected. Therefore, the time required to search the history table 21 can be saved, thereby making it possible to quickly execute the processing for logging fault recovery information.

Further, when the fault recovery information is registered in the corresponding area of the history table 21, the registration position registered in the fault occurrence table 22 is reset. Therefore, it is possible to clearly ascertain the occurrence and correction of a fault. Even if the same fault arises in a duplicated manner, as will be described later, it is possible to quickly carry out the necessary processing without requiring time to search the history table 21.

The interface processing section 1 is provided with the history table 21 and the report order table (a registration order table) 23, and the NEXT report save area (the next registration position holding section) 24, as well. The fact about the occurrence/correction of a fault is registered, as registration order information, in the area of the report order table 23 designated by the registration position registered in the NEXT report save area 24, in the order in which the fault information has been registered in the history table 21, together with the registration position of the registration order information. Further, the next registration position of the NEXT report save area 24 is registered. Therefore, the order of occurrence and correction of faults can be automatically registered in good order.

The above-described interface processing section 1 fetches fault occurrence information or fault recovery information corresponding to the registration order information registered in the NEXT report area (the finally-registration position holding section) 25 from the history table 21. The thus-fetched information is reported to the monitoring apparatus 50. Therefore, the state of reporting of the information to the monitoring apparatus 50 can be automatically and correctly ascertained.

(B2) Processing in the case where the main signal unit control section 53 is restarted As previously described, if the fault occurrence information is received, the alarm processing section 2B decides whether or not the area of the fault occurrence table 22 corresponding to fault K is "null" (STEP S5 shown in FIG. 12). At this time, if the area corresponding to the fault K is not "null" upon reference to the fault occurrence table 22 (YES in STEP S5 shown in FIG. 12, and see STEP A12 shown in FIG. 17), the fault occurrence information will not be registered in the history table 21.

In other words, even if the occurrence of the same fault K is reported as a result of restarting of the main signal unit control section 53 after the removal and attachment of the same, the alarm processing section 2B refers to the fault occurrence table 22 when registering the fault occurrence information in the history table 21. Further, if the registration position regarding the same type of fault occurrence information has already been registered, it is decided that the fault occurrence information has been reported with regard to the same fault K in a duplicated manner. Such fault occurrence information is not registered in the history table 21. Accordingly, the same fault information is not registered in the history table 21 in a duplicated manner, and the amount of resource required by the history table 21 can be minimized.

Figure 17:
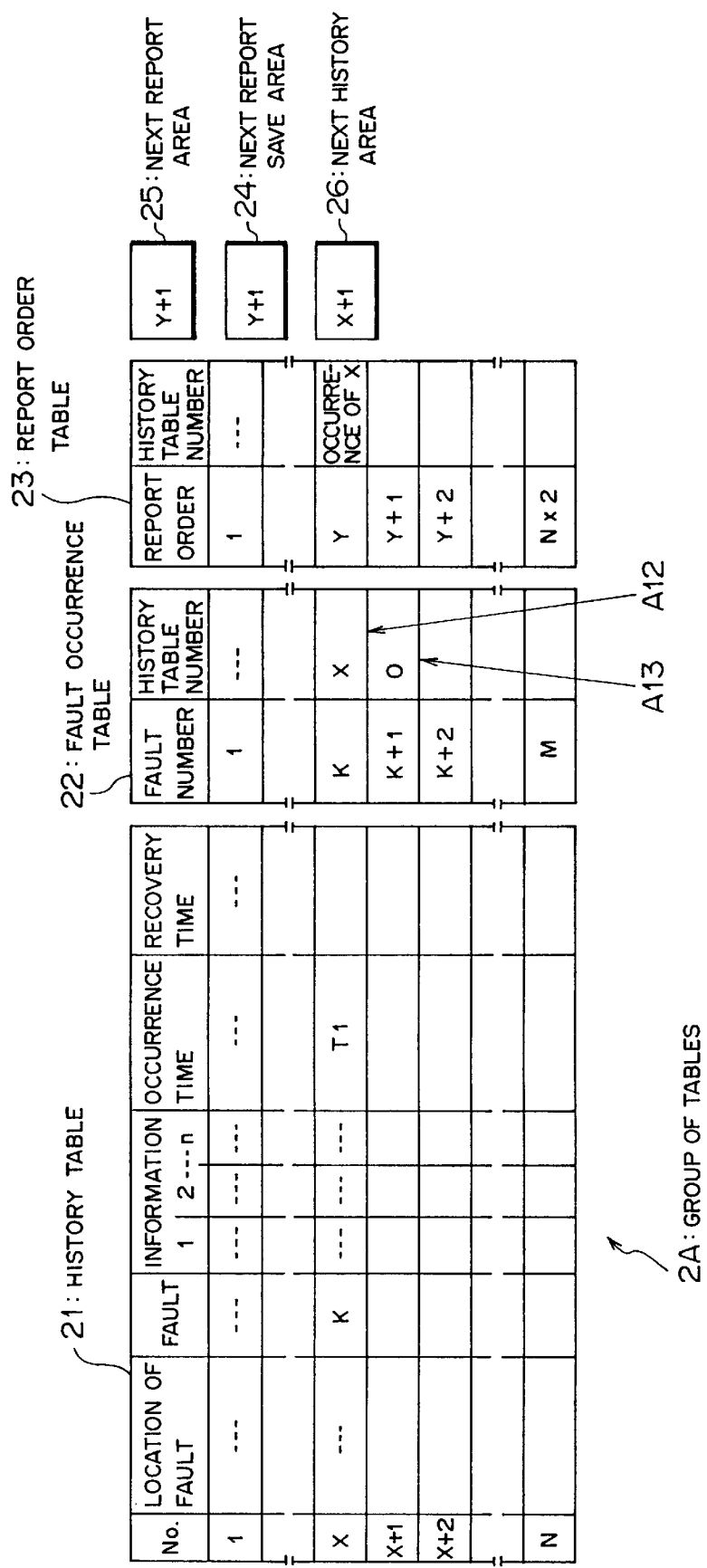
FIG. 17 is a schematic representation for explaining the operation of the alarm processing section according to the embodiment of the present invention.

For example, assume that the alarm processing section 2B has received a report of correction of fault K+1 from the main signal unit control section 53 at time T3 at which the fault K+1 is being corrected (the fault has been corrected or has not occurred), as shown in STEP A13 shown in FIG. 17. In this case, the alarm processing section 2B initially refers to the fault occurrence table 22. However, the area of the fault occurrence table 22 corresponding to the fault K+1 is "null" (NO in STEP S19 shown in FIG. 15), and the fault occurrence information is registered in the manner as previously described with reference to STEPS S5 to S12 shown in FIG. 12 (STEP S26 shown in FIG. 15). Thereafter, the registration process of the fault recovery information is carried out in the same manner as shown in STEPS S20 to S25 shown in FIG. 15.

Figure 18:
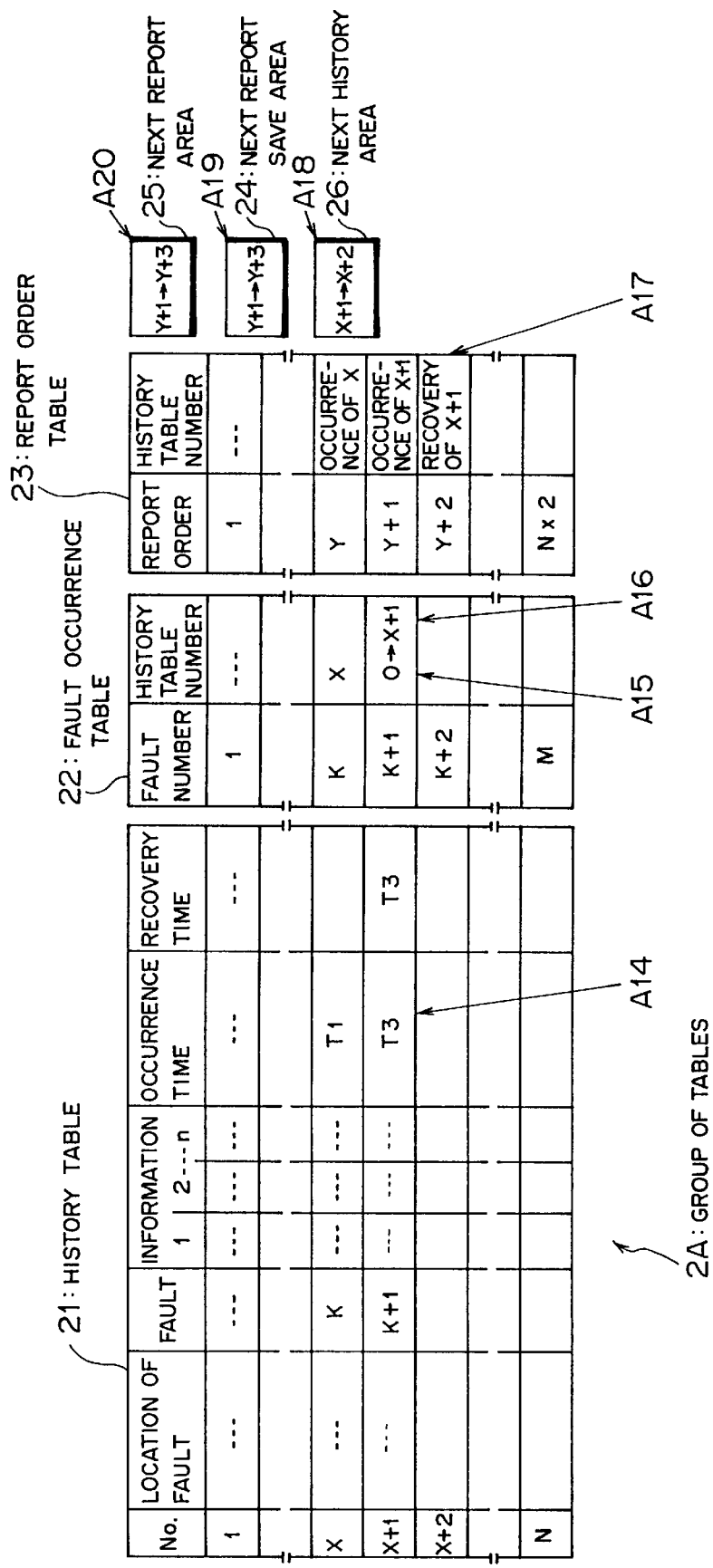
FIG. 18 is a schematic representation for explaining the operation of the alarm processing section according to the embodiment of the present invention.

At this time, the area of the fault K+1 of the fault occurrence table 22 is "null" (STEP A15), as shown in FIG. 18. Therefore, the alarm processing section 2B decides that the fault K+1 has not been registered (or the fault K+1 has been lost) for any reasons (e.g., a breakdown of the communication between the interface processing section 1 and the main signal unit control section 53, or damage to the history table 21). The fault "K+1" and time "T3" at which the fault "K+1" has occurred are written, as fault occurrence information, into the area of the history table 21 designated by the value "X+1" of the NEXT history area 26. The recovery time "T3" is written as the fault recovery information (STEP A14), and then the value of the NEXT history area 26 is incremented by one ("X+2") (STEP A18).

"X+1" is written into the area of the fault occurrence table 22 corresponding to the fault K+1 as the HP value representing the registration position of the history table 21 (STEP A16). "OCCURRENCE OF X+1" is written into the area (a Y+1-th area) of the report order table 23 designated by the RP value ("Y+1") of the NEXT report save area 24. Further, "CORRECTION OF X+1" is written into the next area (a Y+2-th area) (STEP A17). As a result, the NEXT report save area 24 is increased to two (STEP A19).

As a result, the report communication section 3 carries out a reporting operation with respect to the above-described monitoring apparatus 50 (see STEPS S13 to S18 shown in FIG. 14). An unreported data of the history table 21 corresponding to the difference between the NEXT report save area 24 and the NEXT report area 25 ("Y+1" and "Y+2" in this case) is reported to the monitoring apparatus 50. The value of the NEXT report area 25 is incremented ("Y+3") by the number of reporting actions of the unreported data (two) (STEP A20).

In this way, according to the above-described interface processing section 1, if the registration position of the history table 21 related to the information about the fault K+1 has not been registered (or "null" has been registered) in the fault occurrence table 22 when the recovery-information regarding the fault K+1 is received, the fault occurrence information and the fault recovery information will be registered in the corresponding area of the history table 21. As a result, it is possible to correctly register the information about the fault in the history table 21. Further, it is possible to report the information to the monitoring apparatus 50, thereby contributing to considerable improvements in the reliability of the interface processing section 1.

(B3) Processing in the case where communication with the monitoring apparatus 50 is impossible If fault information cannot be reported to the monitoring apparatus 50 due to impossibility of the communication with the monitoring apparatus 50, the interface processing section 1 will sequentially write and store fault information received from the main signal unit control section 53 into the history table 21 until the communication with the monitoring apparatus 50 recovers from a disconnected condition.

Figure 19:
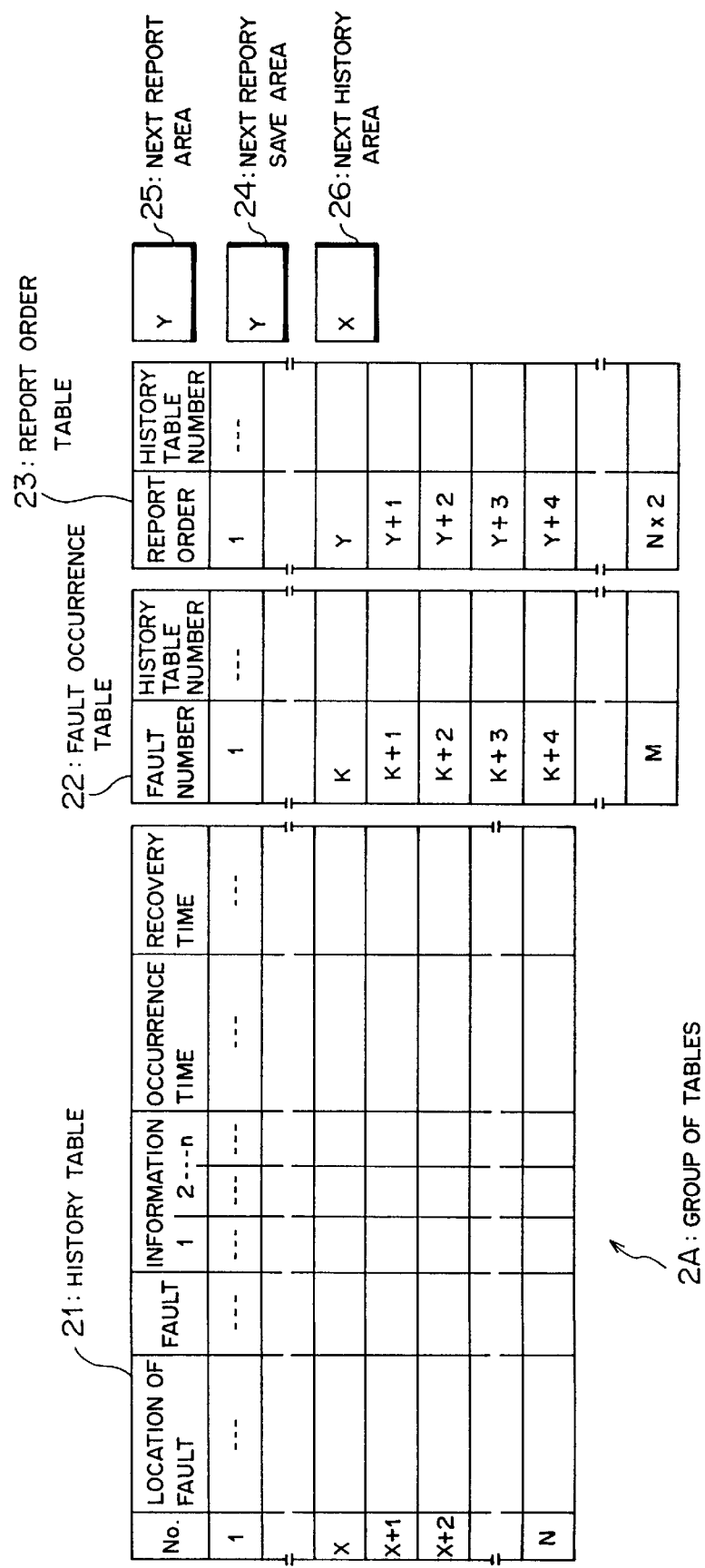
FIG. 19 is a schematic representation for explaining the operation of the alarm processing section according to the embodiment of the present invention.

For example, assume that the alarm processing section 2A (i.e., the history table 21, the fault occurrence table 22, the report order table 23, the NEXT report save area 24, the NEXT report area 25, and the NEXT history area 26) becomes impossible to communicate with the monitoring apparatus 50 in such a condition as shown in FIG. 19.

In this condition, if the main signal unit control section 53 sequentially reports the information about occurrence of fault K at time T1, occurrence of fault K+4 at time T2, and correction of the fault K at time T3, the HP value of the NEXT report save area 24 is sequentially incremented (+1) in accordance with the steps S1 to S26, and the information pieces will be written into the areas of the history table 21 designated by the HP values (i.e., an X-th area and an X+1-th area).

Figure 20:
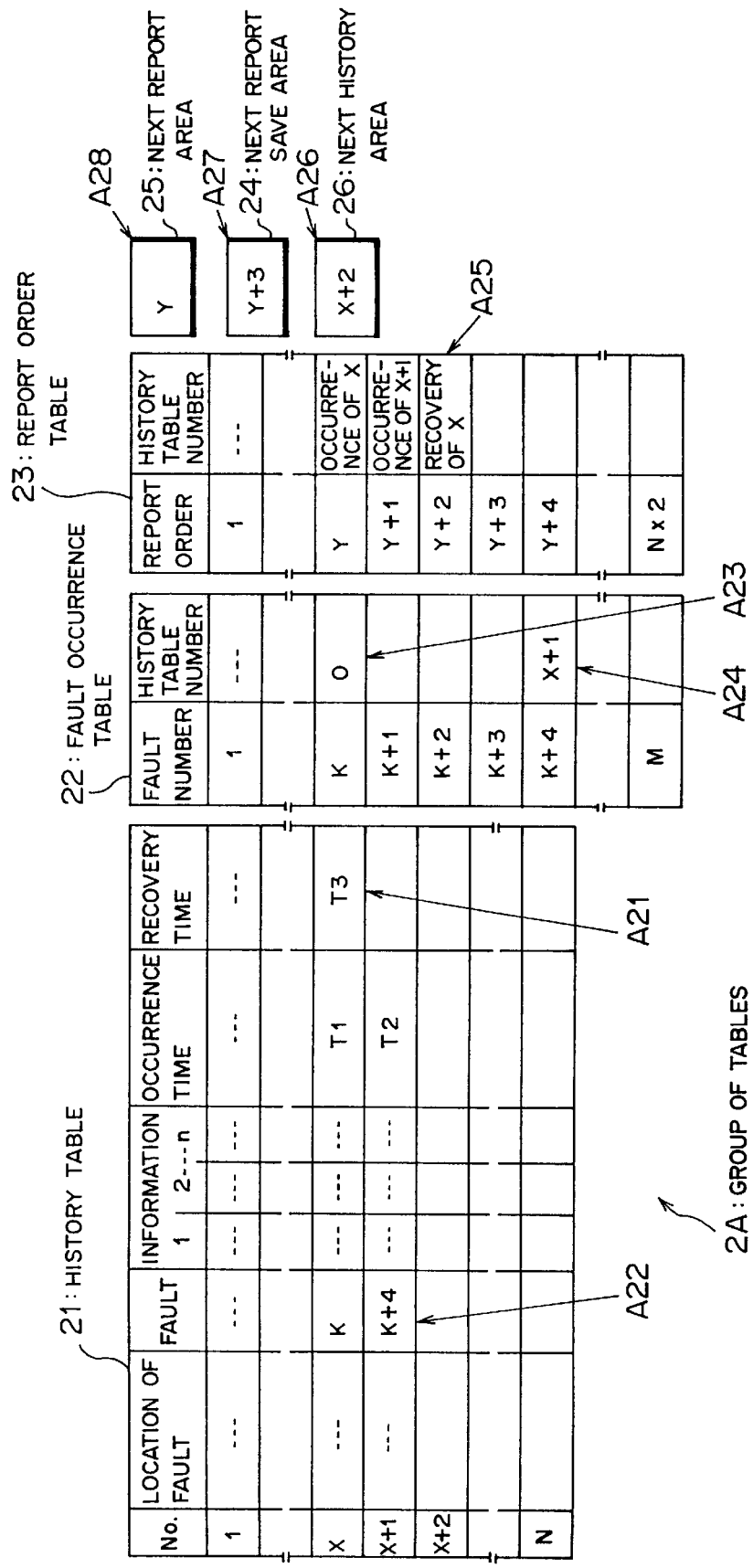
FIG. 20 is a schematic representation for explaining the operation of the alarm processing section according to the embodiment of the present invention.
Figure 21:
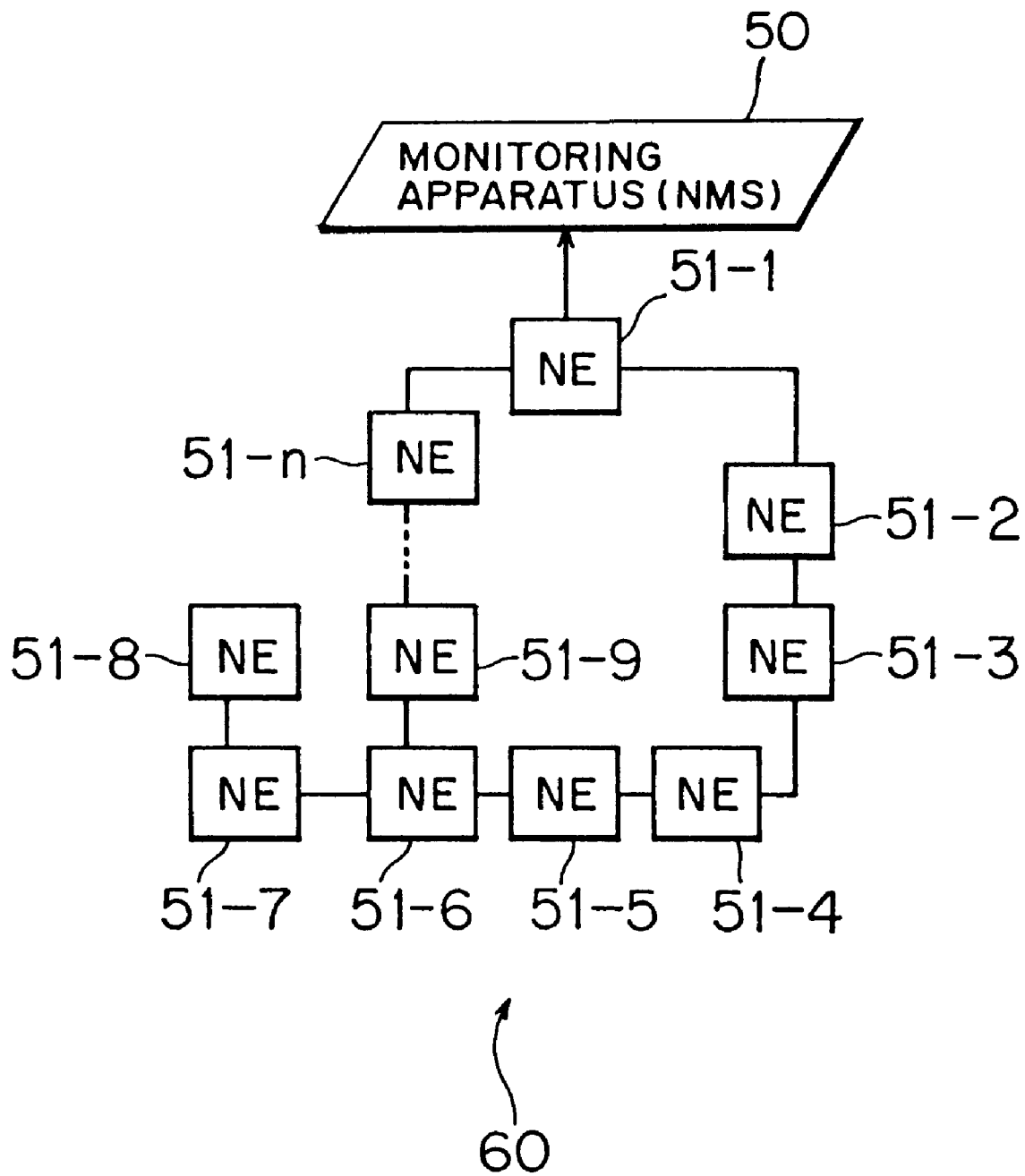
FIG. 21 is a block diagram for showing one example of a transmission apparatus monitoring system.

More specifically, the information about the occurrence of fault "K" and the time "T1" at which the fault has occurred are written into the X-th area of the history table 21, as shown in FIG. 20. Recovery time "T3" is written as the recovery information related to the fault K (STEP A21), and fault "K+4" and time "T2" at which the fault has occurred are written into the next X+1-th area as the fault occurrence information about the fault K+4 (STEP A22).

At this time, the fault K is corrected by the time T3 in the fault occurrence table 22, and hence a history table number ("X") of the area corresponding to the fault K is cleared (STEP A23). The registration position ("X+1") is written into the area of the history table 21 corresponding to the fault K+4 (STEP A24).

Further, "OCCURRENCE OF X" is written into the Y-th area of the report order table 23 designated by the value "Y" registered in the NEXT report save area 24. Thereafter, "OCCURRENCE OF X+1" is written into the Y+1-th area, and "RECOVERY OF X" is written into the Y+2-th area. As a result, information about the order of report of the information to the monitoring apparatus 50 (i.e., the order in which the information is registered in the history table 21) is prepared (STEP A25).

Consequently, the value of the NEXT history area 26 is incremented by two (i.e., the value becomes "X+2") (STEP A26), and the value to be registered in the NXT report save area is incremented by three (i.e., the value becomes "Y+3") (STEP A27).

The report communication section 3 is incommunicable with the monitoring apparatus 50 (NO in STEP S13 shown in FIG. 14), and hence the aforementioned information cannot be reported to the monitoring apparatus 50. However, when the report communication section 3 becomes possible to communicate with the monitoring apparatus 50 (YES in STEP S13 shown in FIG. 14), the value of the NEXT report save area 24 ("Y+3") and the value ("Y") of the NEXT report area 25 are compared to each other (see STEPS A27 and A28).

Consequently, it is seen that the fault information on the history table 21 corresponding to the difference between "Y+3" and "Y"; i.e., three, has not yet been reported to the monitoring apparatus 50. The corresponding fault information is fetched from the history table 21 on the basis of the history table number registered in the report order table 23, and the thus-fetched information is reported to the monitoring apparatus 50.

As described above, according to the above-described interface processing section 1, if there is the difference between the value registered in the NEXT report area 25 and the value registered in the NEXT report save area 24, the fault occurrence information or fault recovery information corresponding to the difference between the values will be fetched from the history table 21, and the thus-fetched information will be reported to the monitoring apparatus 50. Therefore, it is possible to easily ascertain the information which has not been reported to the monitoring apparatus 50. Further, it is possible to correctly report all the logged fault information pieces to the monitoring apparatus 50.

As has been described above, according to the interface processing section 1 according to the present embodiment of the invention, the preparation of a fault history for the monitoring apparatus 50, and the reporting of the fault information to the monitoring apparatus 50 can be carried out independently of each other. Therefore, it is possible to quickly and correctly carry out these processing operations individually. Consequently, it is possible to report all of the received fault information to the monitoring apparatus 50, thereby resulting in considerable improvements in the processing capability of the fault information management apparatus.

(C) Others

The above embodiment has been described in detail with respect to the group of tables 2A including the history table 21, the fault occurrence table 22, and the report order table (or the registration order table) 23. However, the group of tables 2A may be provided with only the history table 21 and the fault occurrence table 22. Even in such a case, it is possible to eliminate the time required to search the positions of the history table 21 in which information about correction of that fault is written when the fault is corrected, which provides an effect of making it possible to quickly carry out a logging operation of the fault recovery information. Even in this case, the identical information is not written into the history table 21 in a duplicated manner. Therefore, it is possible to prevent the identical fault information from being reported to the monitoring apparatus 50 in a duplicated manner.

Even if the group of tables 2A is provided with only the history table 21 and the report order table 23, the fault information (particularly, the time at which the fault has arisen and the time at which the fault has been corrected) will be sequentially stored in the report order table 23 in good order. As a result, there will be achieved an effect of making it possible to constantly report the fault information to the monitoring apparatus 50 in proper order.

Although one monitoring apparatus 50 collectively monitors the plurality of transmission apparatuses 51-i in the present embodiment, the present invention can be realized even if the monitoring apparatus 50 monitors the transmission apparatuses 51-i one by one. Further, although the interface processing section 1 of the present embodiment is applied to the SDH transmission network, the present invention is not limited to this type of network. The present invention may be applied to other networks.

What is claimed is:

1. A fault information management apparatus which is used with a transmission apparatus for sending information in a network, and which manages information related to faults that occurred in the transmission apparatus and provides the fault information to a monitoring apparatus for the transmission apparatus, the fault information management apparatus comprising:

a fault history preparation section which, upon receipt of the fault information, prepares a fault history for said monitoring apparatus, said fault history preparation section including:

a history table for holding, in a paired manner, fault occurrence information received when a fault has occurred in said transmission apparatus and fault recovery information received when the fault has been corrected, a fault occurrence table for holding a registration position of the fault occurrence information on said history table, a fault information processing section for controlling registration process of the fault occurrence information and fault recovery information into said history table, and for registration process of the registration position of the fault occurrence information on said history table into said fault occurrence table, said fault information processing section having a structure such that if the registration position of the fault occurrence information has not been registered in said fault occurrence table when the fault occurrence information is received, the fault occurrence information and the fault recovery information are registered in the corresponding areas of said history table; and a report processing section which, on the basis of the fault history prepared by said fault history preparation section and independently of fault history preparation processing carried out by said fault history preparation section, carries out processing for reporting the fault information to said monitoring apparatus.

2. The fault information management apparatus according to claim 1, wherein said fault information processing section has a structure so as to register the fault occurrence information to a corresponding area of said history table upon receipt of the fault occurrence information, register the registration position of the fault occurrence information into said fault occurrence table, and register the fault recovery information into the corresponding area of said history table designated by the registration position obtained by reference to said fault occurrence table, upon receipt of the fault recovery information as a result of correction of the fault.

3. The fault information management apparatus according to claim 2, wherein said fault information processing section has a structure such that when the fault recovery information is registered into the corresponding area of said history table, the registration position registered in said fault occurrence table is reset.

4. A fault information management apparatus which is used with a transmission apparatus for sending information in a network, and which manages information related to faults that occurred in the transmission apparatus and provides the fault information to a monitoring apparatus for the transmission apparatus, the fault information management apparatus comprising:

a fault history preparation section which, upon receipt of the fault information, prepares a fault history for said monitoring apparatus, said fault history preparation section including:

a history table for holding, in a paired manner, fault occurrence information received when a fault has occurred in said transmission apparatus and fault recovery information received when the fault has been corrected, a fault occurrence table for holding a registration position of the fault occurrence information on said history table, and a fault information processing section for controlling registration process of the fault occurrence information and fault recovery information into said history table, and for registration process of the registration position of the fault occurrence information on said history table into said fault occurrence table, said fault information processing section having a structure so as to register the fault occurrence information to a corresponding area of said history table upon receipt of the fault occurrence information, the registration position of the fault occurrence information into said fault occurrence table, and the fault recovery information into the corresponding area of said history table designated by the registration position obtained by reference to said fault occurrence table, upon receipt of the fault recovery information as a result of correction of the fault; and a report processing section which, on the basis of the fault history prepared by said fault history preparation section and independently of fault history preparation processing carried out by said fault history preparation section, carries out processing for reporting the fault information to said monitoring apparatus;

wherein said structure of said fault information processing section is such that when the fault occurrence information is registered in said history table, said fault occurrence table is referred, and if the registration position regarding the same type of fault occurrence information has already been registered, the fault occurrence information is not registered in said history table.

5. The fault information management apparatus according to claim 4, wherein said fault information processing section has a structure such that when the fault recovery information is registered into the corresponding area of said history table, the registration position registered in said fault occurrence table is reset.

6. A fault information management apparatus which is used with a transmission apparatus for sending information in a network, and which manages information related to faults that occurred in the transmission apparatus and provides the fault information to a monitoring apparatus for the transmission apparatus, the fault information management apparatus comprising:

a fault history preparation section which upon receipt of the fault information prepares a fault history for said monitoring apparatus;

a report processing section which, on the basis of the fault history prepared by said fault history preparation section and independently of fault history preparation processing carried out by said fault history preparation section, carries out processing for reporting the fault information to said monitoring apparatus;

wherein said fault history preparation section includes a history table for holding fault occurrence information, which is received when a fault has arisen in said transmission apparatus, and fault recovery information, which is received when the fault has been corrected, in a paired manner in the order of occurrence and correction, a registration order table for holding said registration order of the fault occurrence information and the fault recovery information into said history table, and a fault information processing section for controlling both registration process of the fault occurrence information and the fault recovery information into said history table and registration process of the registration order into said registration order table; and wherein said report processing section has a structure so as to notify said monitoring apparatus of the fault occurrence information or the fault recovery information on the basis of said registration order registered in said registration order table.

7. The fault information management apparatus according to claim 6, wherein said fault history preparation section further comprises a next registration position holding section for holding a registration position on said registration order table with regard to registration order information to be subsequently registered in said registration order table; and said fault information processing section has a structure so as to register the registration order information in an area on said registration order table designated by the registration position which is registered in said next registration position holding section, and to register the next registration position of said registration order table into said next registration position holding section.

8. The fault information management apparatus according to claim 6, wherein said fault history preparation section further comprises a final registration position holding section for holding a registration position on said registration order table with regard to the registration order information finally registered in said registration order table, and said report processing section has a structure so as to fetch from said history table the fault occurrence information or the fault recovery information corresponding to the registration order information retained in an area of said registration order table designated by the registration position which is registered in said final registration position holding section and to report the thus-fetched fault occurrence information or fault recovery information to said monitoring apparatus.

9. The fault information management apparatus according to claim 6, wherein said fault history preparation section further comprises a next registration position holding section for holding a registration position on said registration order table with regard to registration order information to be subsequently registered in said registration order table, a final registration position holding section for holding a registration position on said registration order table with regard to the registration order information finally registered in said registration order table; said fault information processing section has a structure so as to register the registration order information in an area of said registration order table designated by the registration position which is registered in said next registration position holding section, and to register the next registration position of said registration order table in said next registration position holding section; and said report processing section fetches from said history table the fault occurrence information or the fault recovery information corresponding to pieces of the registration position information the number of which corresponds to the difference between the registration positions and reports the thus-fetched information to said monitoring apparatus, when the registration position registered in said final registration position holding section and the registration position registered in said next registration position holding section are different from each other.

10. A fault information management apparatus for sending information in a network, and which manages information related to faults that occurred in the transmission apparatus and provides the fault information to a monitoring apparatus for the transmission apparatus, the fault information management apparatus comprising:

a fault history preparation section which, upon receipt of the fault information, prepares a fault history for said monitoring apparatus;

a report processing section which, on the basis of the fault history prepared by said fault history preparation section and independently of fault history preparation processing carried out by said fault history preparation section, carries out processing for reporting the fault information to said monitoring apparatus;

wherein said fault history preparation section includes a history table for holding fault occurrence information, which is received when a fault has arisen in said transmission apparatus, and fault recovery information, which is received when the fault has been corrected, in a paired manner in the order of occurrence and correction, a fault occurrence table for holding the registration position of the fault occurrence information on said history table, a registration order table for the registration order of the fault occurrence information and the fault recovery information in said history table, and a fault information processing section for controlling registration process of the fault occurrence information and the fault recovery information into said history table, registration process of the registration position into said fault occurrence table, and registration process of the registration order into said registration order table; and wherein said report processing section has a structure so as to notify said monitoring apparatus of the fault occurrence information or the fault recovery information on the basis of said registration order registered in said registration order table.

11. The fault information management apparatus according to claim 10, wherein said fault information processing section has a structure so as to register the fault occurrence information to a corresponding area of said history table upon receipt of the fault occurrence information, register the registration position of the fault occurrence information to said fault occurrence table, and register the fault recovery information into the corresponding area of said history table designated by the registration position obtained by reference to said fault occurrence table, upon receipt of the fault recovery information as a result of correction of the fault.

12. The fault information management apparatus according to claim 11, wherein said fault information processing section has a structure such that when the fault recovery information is registered into the corresponding area of said history table, the registration position registered in said fault occurrence table is reset.

13. The fault information management apparatus according to claim 11, wherein said fault information processing section has a structure such that when the fault occurrence information is registered in said history table, said fault occurrence table is referred, and if the registration position regarding the same type of fault occurrence information has already been registered, the fault occurrence information is not registered in said history table.

14. The fault information management apparatus according to claim 10, wherein said fault information processing section has a structure such that if the registration position of the fault occurrence information has not been registered in said fault occurrence table when the fault recovery information is received, the fault occurrence information and the fault recovery information are registered in the corresponding areas of said history table.

15. The fault information management apparatus according to claim 10, wherein said fault history preparation section further comprises a next registration position holding section for holding a registration position on said registration order table with regard to registration order information to be subsequently registered in said registration order table, a final registration position holding section for holding a registration position on said registration order table with regard to the registration order information finally registered in said registration order table; said fault information processing section has a structure so as to register the registration order information in an area of said registration order table designated by the registration position which is registered in said next registration position holding section, and to register the next registration position of said registration order table in said next registration position holding section; and said report processing section fetches from said history table the fault occurrence information or the fault recovery information corresponding to pieces of the registration position information the number of which corresponds to the difference between the registration positions and reports the thus-fetched information to said monitoring apparatus, when the registration position registered in said final registration position holding section and the registration position registered in said next registration position holding section are different from each other.

16. A method of managing information related to faults in a transmission apparatus which sends information in a network under observation of a monitoring apparatus, using a fault information apparatus, which has a fault history preparation section including a history table and a fault occurrence table, said method comprising the steps of:

(a) upon receipt of fault information on every fault in the transmission apparatus, preparing a fault history by registering fault occurrence information into the history table in the order of occurrence,
when the individual fault has then been corrected in the transmission apparatus, registering fault recovery information into the history table in a paired manner with said fault occurrence information in the order of correction, and
registering the registration positions of said fault occurrence information and said fault recovery information on the history table into the fault occurrence table at areas corresponding to said registration positions on the history table;

(b) preparing report information, which is required when reporting the monitoring apparatus of said fault history, independently of said fault history; and (c) reporting said fault history to the monitoring apparatus in accordance with said report information.

17. A method of managing information related to faults in a transmission apparatus which sends information in a network under observation of a monitoring apparatus, using a fault information apparatus, which has a fault history preparation section including a history table and a registration order table, said method comprising the steps of:

(a) upon receipt of fault information on every fault in the transmission apparatus, preparing a fault history by registering fault occurrence information into the history table in the order of occurrence,
when the individual fault has then been corrected in the transmission apparatus, registering fault recovery information into the history table in a paired manner with said fault occurrence information in the order of correction, and
registering the registration order of said fault occurrence information and said registration order information on the history table into the registration order table at areas corresponding to said registration order on the history table; and (b) reporting said fault occurrence information and said fault recovery information one at a time to the monitoring apparatus in the order of registration on the history table in accordance with the registration order table.

18. A fault information management apparatus which is used with a transmission apparatus for sending information in a network, and which manages information related to faults that occurred in the transmission apparatus and provides the fault information to a monitoring apparatus for the transmission apparatus, the fault information management apparatus comprising:

a fault history preparation section which, upon receipt of the fault information, prepares a fault history for said monitoring apparatus, said fault history preparation section including:
a history table for holding, in a paired manner, fault occurrence information received when a fault has occurred in said transmission apparatus and fault recovery information received when the fault has been corrected,
a fault occurrence table for holding a registration position of the fault occurrence information on said history table, and
a fault information processing section for controlling registration process of the fault occurrence information and fault recovery information into said history table, and for registration process of the registration position of the fault occurrence information on said history table into said fault occurrence table; and
a report processing section which, on the basis of the fault history prepared by said fault history preparation section and independently of fault history preparation processing carried out by said fault history preparation section, carries out processing for reporting the fault information to said monitoring apparatus;
wherein said structure of said fault information processing section is such that when the fault occurrence information is registered in said history table, said fault occurrence table is referred, and if the registration position regarding the same type of fault occurrence information has already been registered, the fault occurrence information is not registered in said history table.

* * * * *